US011027195B2

(12) United States Patent
Yokoyama et al.

(10) Patent No.: US 11,027,195 B2
(45) Date of Patent: Jun. 8, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Ryo Yokoyama, Tokyo (JP); Ikuo Yamano, Tokyo (JP); Osamu Ito, Tokyo (JP); Yosuke Matsuzaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 16/302,764

(22) PCT Filed: Apr. 6, 2017

(86) PCT No.: PCT/JP2017/014384
§ 371 (c)(1),
(2) Date: Nov. 19, 2018

(87) PCT Pub. No.: WO2018/012062
PCT Pub. Date: Jan. 18, 2018

(65) Prior Publication Data
US 2019/0291002 A1    Sep. 26, 2019

(30) Foreign Application Priority Data

Jul. 12, 2016 (JP) .............................. JP2016-137894

(51) Int. Cl.
*A63F 13/285* (2014.01)
*A63F 13/211* (2014.01)
(Continued)

(52) U.S. Cl.
CPC .......... *A63F 13/285* (2014.09); *A63F 13/211* (2014.09); *A63F 13/213* (2014.09);
(Continued)

(58) Field of Classification Search
None
See application file for complete search history.

(56) References Cited

U.S. PATENT DOCUMENTS

| 2008/0291179 | A1* | 11/2008 | Willemsen | G06F 3/0386 345/180 |
| 2015/0260474 | A1* | 9/2015 | Rublowsky | A63F 13/213 434/16 |
| 2016/0182877 | A1* | 6/2016 | Deluca | H04N 13/332 348/53 |

\* cited by examiner

*Primary Examiner* — Ifedayo B Iluyomade
(74) *Attorney, Agent, or Firm* — Paratus Law Group, PLLC

(57) ABSTRACT

There is provided an information processing apparatus, an information processing method, and a program that enable a predetermined haptic stimulus to be presented to a number of corresponding input devices on the basis of inputs from the input devices and thereby realize an intuitive haptic interface that gives a deeper sense of realism. The information processing apparatus includes: an acquisition unit configured to acquire a plurality of pieces of pointer information on the basis of one or a plurality of pieces of sensor data; a discrimination unit configured to discriminate an input device corresponding to each pointer on the basis of characteristics of the plurality of pieces of pointer information; and a generation unit configured to generate a predetermined haptic stimulation signal to be output to an input device corresponding to a pointer in a case in which a position of the pointer satisfies a predetermined condition.

19 Claims, 22 Drawing Sheets

(51) Int. Cl.
*A63F 13/219* (2014.01)
*A63F 13/426* (2014.01)
*G06F 3/01* (2006.01)
*G06F 3/038* (2013.01)
*G06F 3/041* (2006.01)
*A63F 13/213* (2014.01)
*A63F 13/42* (2014.01)
*A63F 13/847* (2014.01)
*G06F 3/0346* (2013.01)

(52) U.S. Cl.
CPC ............ *A63F 13/219* (2014.09); *A63F 13/42* (2014.09); *A63F 13/426* (2014.09); *A63F 13/847* (2014.09); *G06F 3/011* (2013.01); *G06F 3/016* (2013.01); *G06F 3/0346* (2013.01); *G06F 3/0386* (2013.01); *G06F 3/041* (2013.01); *A63F 2300/8023* (2013.01)

2-1 : INPUT DEVICE

FIG. 11

|  | WAVELENGTH 1 | WAVELENGTH 2 | WAVELENGTH 3 |
|---|---|---|---|
| INPUT DEVICE 2-1A | ● | | |
| INPUT DEVICE 2-1B | | ● | |
| INPUT DEVICE 2-1C | ● | ● | |
| INPUT DEVICE 2-1D | | | ● |
| INPUT DEVICE 2-1E | ● | | ● |
| INPUT DEVICE 2-1F | | ● | ● |
| INPUT DEVICE 2-1G | ● | ● | ● |

FIG. 12
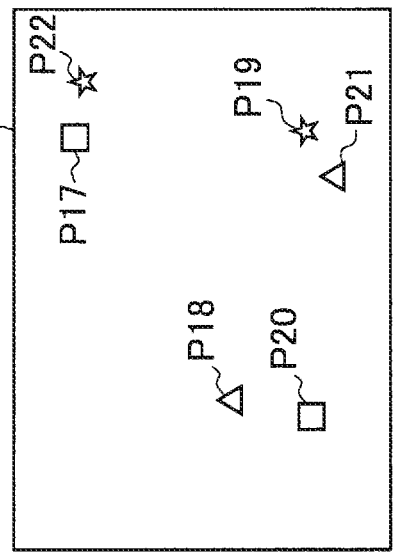
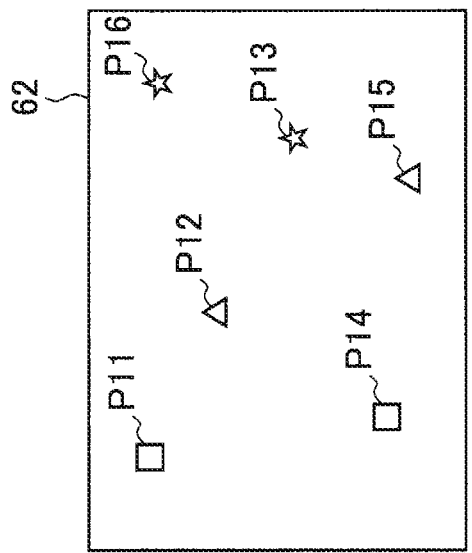
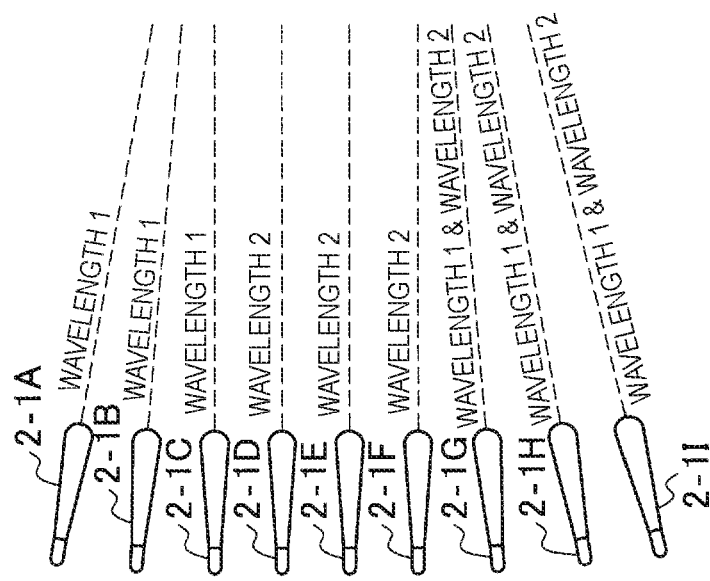

FIG. 16
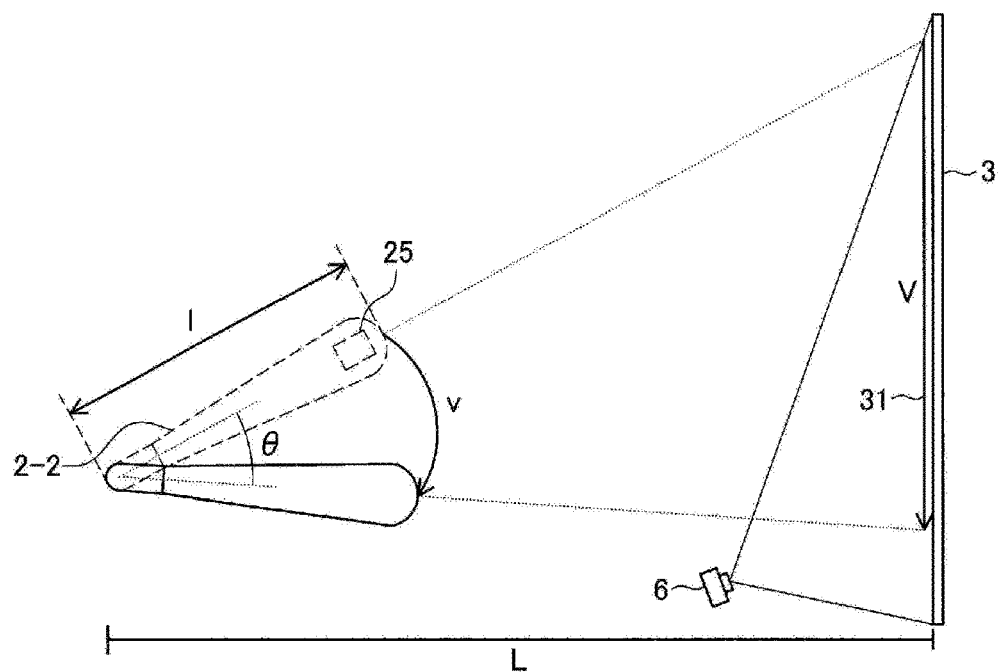
FIG. 17
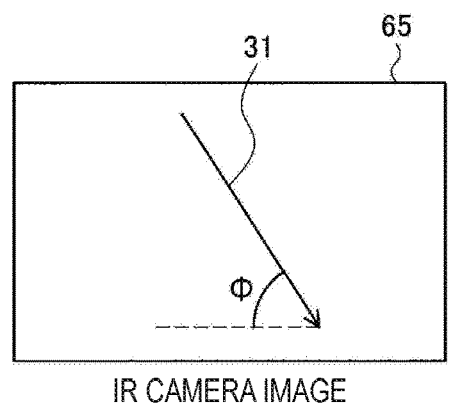
IR CAMERA IMAGE
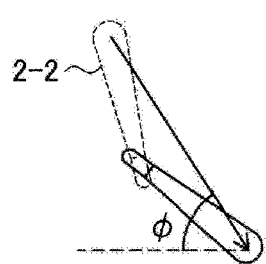

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/014384 (filed on Apr. 6, 2017) under 35 U.S.C. § 371, which claims priority to Japanese Patent Application No. 2016-137894 (filed on Jul. 12, 2016), which are all hereby incorporated by reference in their entirety.

TECHNICAL FIELD

The present disclosure relates to an information processing apparatus, an information processing method, and a program.

BACKGROUND ART

Remote controllers that are connected to televisions and the like through wireless communication for operations have been known since the past.

In addition, in order to increase a sense of realism of content such as movies, video games, and the like, techniques of giving haptic outputs such as vibration together with videos or sounds to users have become normal. Patent Literature 1 mentioned below, for example, discloses a technology of increasing a sense of realism of content by delaying haptic outputs from a controller on the basis of an occurrence position of an event in a virtual space of the content.

CITATION LIST

Patent Literature

Patent Literature 1: JP 2015-166890A

DISCLOSURE OF INVENTION

Technical Problem

However, the above-described related art assumes a case in which controllers are operated by few users in a household or an amusement facility, and has difficulty discriminating a number of controllers and causing a haptic stimulus such as vibration corresponding to each of the controllers to be output thereto.

Therefore, the present disclosure proposes an information processing apparatus, an information processing method, and a program that enable a predetermined haptic stimulus to be presented to a number of corresponding input devices on the basis of inputs from the input devices and thereby realize an intuitive haptic interface that gives a deeper sense of realism.

Solution to Problem

According to the present disclosure, there is proposed an information processing apparatus including: an acquisition unit configured to acquire a plurality of pieces of pointer information on the basis of one or a plurality of pieces of sensor data; a discrimination unit configured to discriminate an input device corresponding to each pointer on the basis of characteristics of the plurality of pieces of pointer information; and a generation unit configured to generate a predetermined haptic stimulation signal to be output to an input device corresponding to a pointer in a case in which a position of the pointer satisfies a predetermined condition.

According to the present disclosure, there is proposed an information processing method including, by a processor: acquiring a plurality of pieces of pointer information on the basis of one or a plurality of pieces of sensor data; discriminating an input device corresponding to each pointer on the basis of characteristics of the plurality of pieces of pointer information; and generating a predetermined haptic stimulation signal to be output to an input device corresponding to a pointer in a case in which a position of the pointer satisfies a predetermined condition.

According to the present disclosure, there is proposed a program causing a computer to function as: an acquisition unit configured to acquire a plurality of pieces of pointer information on the basis of one or a plurality of pieces of sensor data; a discrimination unit configured to discriminate an input device corresponding to each pointer on the basis of characteristics of the plurality of pieces of pointer information; and a generation unit configured to generate a predetermined haptic stimulation signal to be output to an input device corresponding to a pointer in a case in which a position of the pointer satisfies a predetermined condition.

Advantageous Effects of Invention

According to the present disclosure described above, a predetermined haptic stimulus can be presented to a number of corresponding input devices on the basis of inputs from the input devices, and thereby an intuitive haptic interface that gives a deeper sense of realism can be realized.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram for describing an example of a combination of light emission wavelengths of each of input devices in a case in which three types of wavelengths are used in the first embodiment.

FIG. 12 is a diagram for describing a case in which nine input devices are discriminated using two types of wavelengths according to the first embodiment.

FIG. 16 is a diagram for describing calculation of a velocity using a discrimination technique of the second embodiment.

FIG. 17 is a diagram for describing calculation of an angle using the discrimination technique of the second embodiment.

MODE(S) FOR CARRYING OUT THE INVENTION

Figure 1:
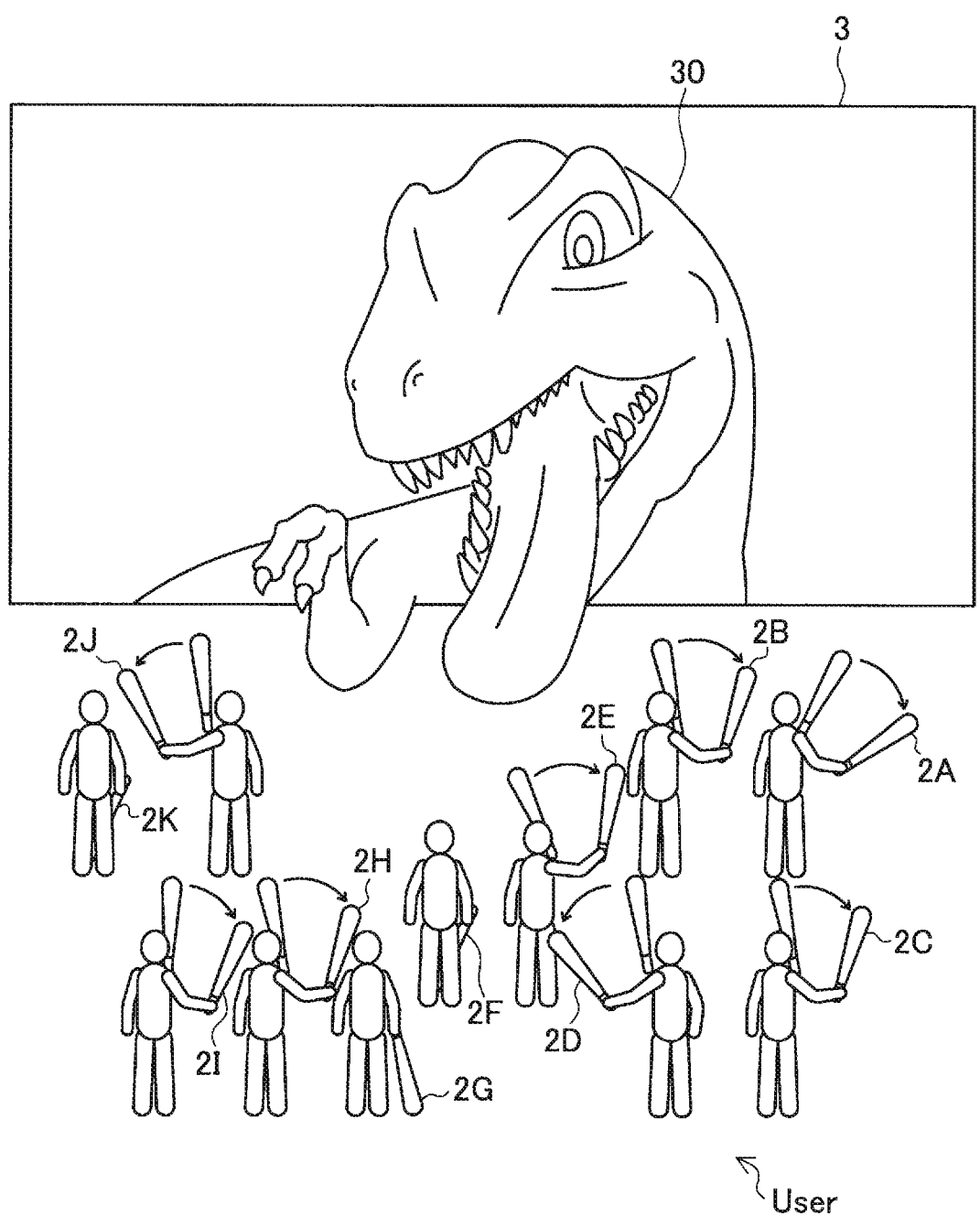
FIG. 1 is a diagram illustrating an overview of an information processing system according to an embodiment of the present disclosure.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.
1. Overview of information processing system according to one embodiment of present disclosure
2. Configuration
2-1. Overall configuration
2-2. Configuration of information processing apparatus
3. First Embodiment
3-1. Overview
3-2. Configuration of input device
3-3. Operation process
3-1. Others
4. Second Embodiment
4-1. Configuration of input device
4-2. Operation process
4-3. First modified example
4-4. Second modified example
5. Supplement
6. Conclusion 1. Overview of Information Processing System According to One Embodiment of Present Disclosure An overview of an information processing system according to an embodiment of the present disclosure will be described with reference to FIG. 1. In the information processing system according to the present embodiment, a number of users carry input devices 2 (2A to 2K) and perform an operation such as swinging the input devices 2 toward a stereoscopic object 30 displayed on a front screen 3. The input devices 2 can each have a light emission unit that emits invisible light rays such as infrared light rays and perform irradiation of pointers with respect to the screen 3.

Since 3D videos are projected on the screen 3 by a projector 5, the users can perform operations such as attacking the stereoscopic object 30 that is approaching the eyes of the users by swinging the input devices 2.

Figure 2:
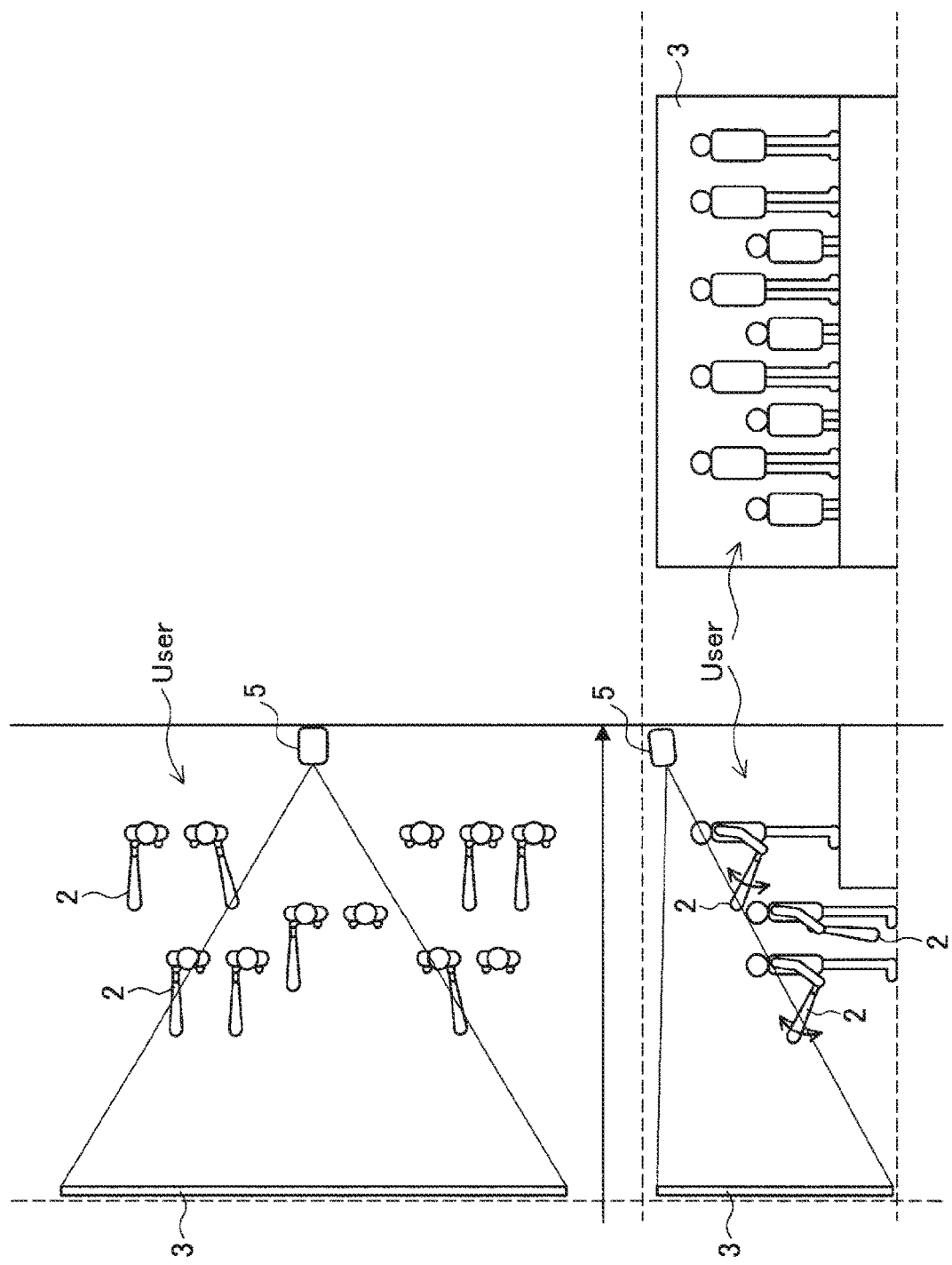
FIG. 2 is a diagram illustrating an example of disposition of a display apparatus, a 3D projector, and users according to the present embodiment.

Next, FIG. 2 illustrates an example of disposition of the screen 3, the projector 5, and users according to the present embodiment. As illustrated in FIG. 2, a number of users are facing the large-size screen 3 and carrying the input devices 2, the projector 5 is disposed above the users, and a 3D video is being projected on the screen 3. In addition, a speaker 7 (FIG. 5) is disposed in a periphery that is not illustrated in FIGS. 1 and 2. Although each of the users is standing in the example illustrated in FIG. 2, they may be sitting. In addition, although the projector 5 is disposed on a ceiling in the example illustrated in FIG. 2, it may be disposed at another position.

In addition, the input device 2 carried by each user may have, for example, a rod shape as illustrated in FIGS. 1 and 2, or a shape simulating a weapon such as a staff or a gun. Each of the input devices 2 has a structure in which it vibrates in accordance with control of an information processing apparatus 1 (see FIG. 5), and when a user performs a predetermined operation with respect to the stereoscopic object 30, the input device can realize a sense of realism such as a feeling with respect to a virtual object in a virtual space by giving feedback with predetermined vibration. Each of the input devices 2 has a light emission unit 22 (see FIG. 8) that emits light such as infrared light at its tip, and when a user operates the input device 2 toward the screen 3, an infrared pointer can be irradiated to the screen 3. When the pointer is superimposed on the stereoscopic object 30, for example, the information processing apparatus 1 gives the user feedback with vibration that causes the user to perceive the input device 2 as having touched the stereoscopic object 30 on the basis of a position of the pointer irradiated on the screen 3 and a display position of the stereoscopic object 30 thereon.

Figure 3:
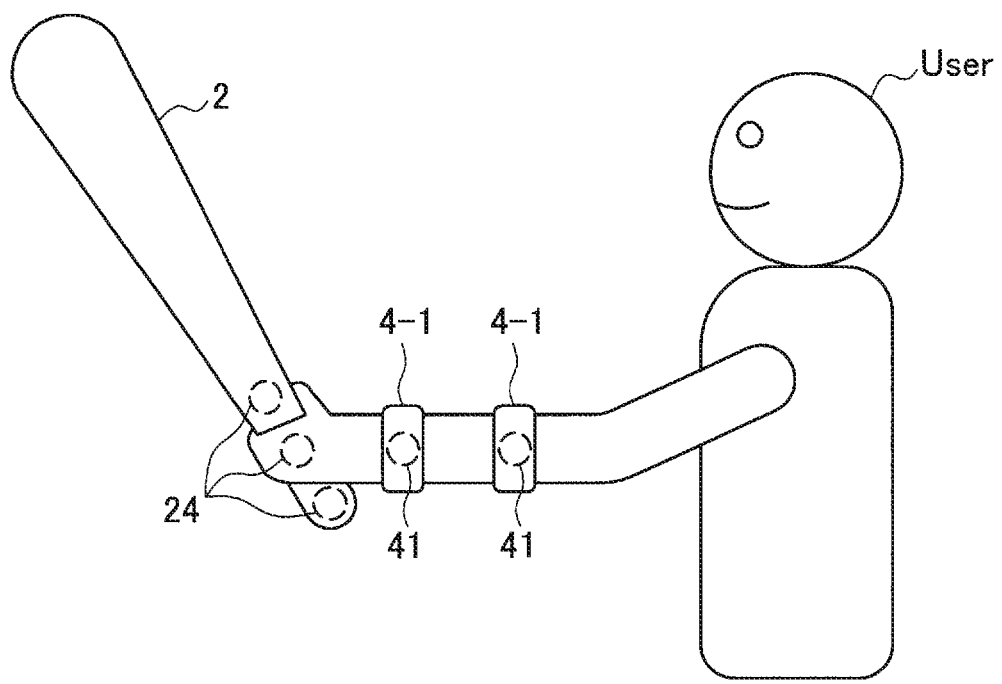
FIG. 3 is a diagram illustrating an example of a vibration unit and a haptic stimulus output device built in an input device according to the present embodiment.

Next, a vibration function of the input devices 2 will be described with reference to FIG. 3. FIG. 3 is a diagram illustrating an example of a vibration unit and a haptic stimulus output device built in each input device according to the present embodiment. A plurality of vibration units 24 are built in the input device 2 as illustrated in FIG. 3, in addition to the above-described light emission unit, and vibrate in accordance with control of the information processing apparatus 1 (see FIG. 5). The input device 2 and the information processing apparatus 1 are connected in a wired or wireless manner and thus can transmit and receive data. The number of built-in vibration units 24 may be plural or singular. In addition, the vibration units 24 may be built in a part of the handle of the input device 2 to be held by a user, or at another position.

Furthermore, in the present embodiment, haptic stimulus output devices 4 are attached to the body of each user as illustrated in FIG. 3. Each of the haptic stimulus output devices 4 and the information processing apparatus 1 are connected in a wired or wireless manner and thus can transmit and receive data. Although a shape of the haptic stimulus output devices 4 is not particularly limited, for example, a band type as illustrated in FIG. 3 is possible. One or more vibration units 41 are built in a band-type haptic stimulus output device 4-1 and vibrate in accordance with control of the information processing apparatus 1. Note that a shape of the haptic stimulus output devices 4 is not limited thereto, and for example, a jacket shape as illustrated in FIG. 4 is possible.

Figure 4:
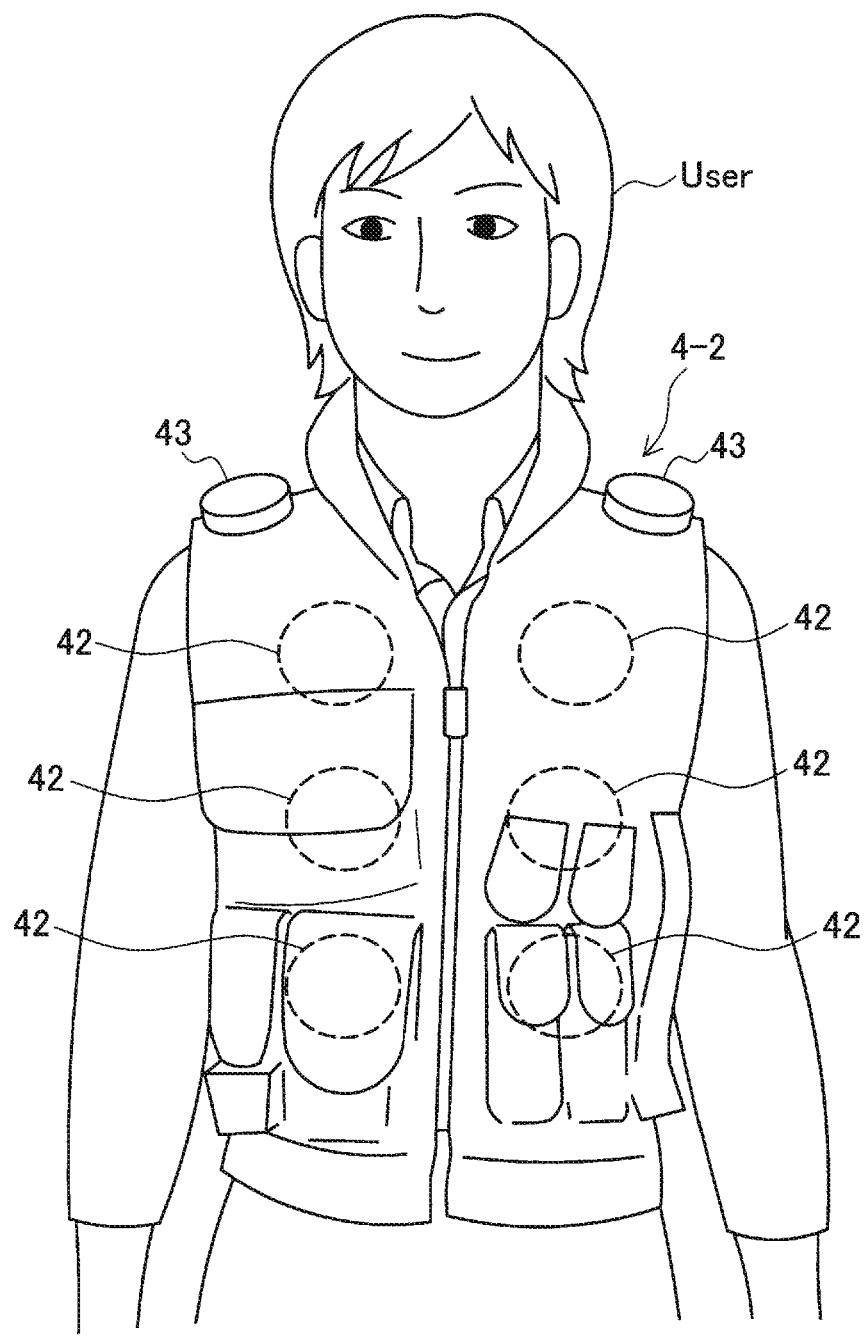
FIG. 4 is a diagram illustrating a jacket-type haptic stimulus output device according to the present embodiment.

A plurality of vibration units 42 are disposed in a jacket-type haptic stimulus output device 4-2, for example, as illustrated in FIG. 4. The number of vibration units 42 and disposition thereof are not limited to the example illustrated in FIG. 4, and the vibration units may be provided on, for example, a back surface or a side surface. In addition, in the case of the jacket type, it is possible to ascertain the approximate position of the body on which each of the vibration units 42 is disposed when worn by a user, unlike the case of the band type, and thus vibration can be given to a target portion of the body with higher accuracy. Note that, although the jacket type is illustrated in the example illustrated in FIG. 4, the present embodiment is not limited thereto, and the haptic stimulus output devices 4 may be other clothes, for example, a coat with sleeves, a top, pants, gloves, a hat, socks, shoes, or the like. In addition, the band-type haptic stimulus output device 4-1 can also be attached to a foot, a body, a head, or the like, in addition to an arm.

In addition, stereo speakers 43 are disposed on parts of the shoulders of the jacket-type haptic stimulus output device 4-2 as illustrated in FIG. 4. The stereo speakers 43 output sounds transmitted from the information processing apparatus 1. The sounds (audio) can be presented to each of the users in accordance with, for example, an operation of the input devices 2 by the users.

In the present embodiment, by presenting a plurality of senses using a 3D video, a sound, vibration, and the like to the users as described above, it is possible to increase a sense of immersion into a virtual space and to realize a deeper sense of realism.

Although "vibration" is used as an example of a haptic stimulus of the haptic stimulus output device 4 in the example described above, the present embodiment is not limited thereto, and another type of haptic stimulus such as an electrical stimulus, a temperature, wind, or water can also be used.

In addition, although the 3D video is projected on the screen 3 in the present embodiment, a large-size display apparatus may be disposed instead.

Next, each configuration of the information processing system according to an embodiment of the present disclosure will be described in detail with reference to the drawings.

2. Configuration

2-1. Overall Configuration

Figure 5:
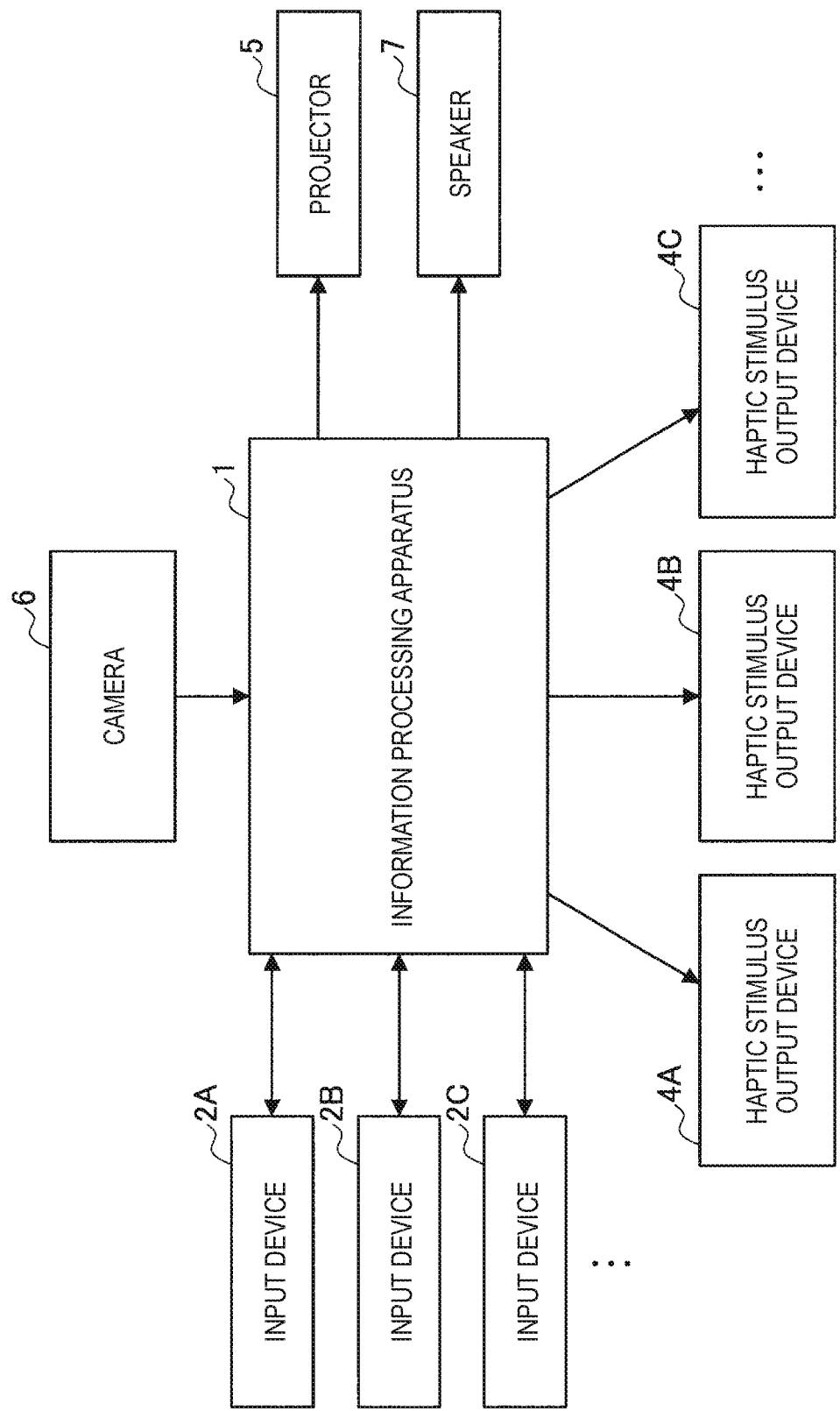
FIG. 5 is a diagram for describing an overall configuration of the information processing system according to the present embodiment.

FIG. 5 is a diagram illustrating an overall configuration of the information processing system according to the present embodiment. The information processing system according to the present embodiment has the information processing apparatus 1, a number of input devices 2 (2A to 2C), a number of haptic stimulus output devices 4 (4A to 4C), the projector 5, a camera 6, and the speaker 7 as illustrated in FIG. 5.

The camera 6 is, for example, an IR camera that captures the screen 3 and outputs a captured image to the information processing apparatus 1.

The information processing apparatus 1 is connected to the input devices 2, the haptic stimulus output devices 4, the camera 6, the projector 5, and the speaker 7, and controls each of the peripheral apparatuses. For example, the information processing apparatus 1 controls projection of 3D videos on the screen 3 by the projector 5 and controls output of sounds from the speaker 7. In addition, the information processing apparatus 1 ascertains an input state of each of the input devices 2 with respect to a display screen of the screen 3 on the basis of the captured image output from the camera 6 and performs control such that a predetermined haptic stimulus is output from a corresponding input device 2 and a haptic stimulus output device 4 of a user carrying the input device in accordance with the input state.

Each of the input devices 2 is an input device with a light emission unit 22 and a vibration unit 24 (see FIG. 8) and is carried by each of users. In addition, the input device 2 can output vibration from the vibration unit 24 in accordance with control of the information processing apparatus 1.

Each of the haptic stimulus output devices 4 is an output device with the vibration units 42 (see FIGS. 3 and 4) and is attached to each user. In addition, the haptic stimulus output device 4 can output vibration from the vibration units 42 in accordance with control of the information processing apparatus 1.

The projector 5 is an output device with a projection unit, and projects, for example, 3D videos on the screen 3 in accordance with control of the information processing apparatus 1.

The speaker 7 is an output device that outputs sounds, and outputs sound signals in accordance with control of the information processing apparatus 1.

2-2. Configuration of Information Processing Apparatus

Figure 6:
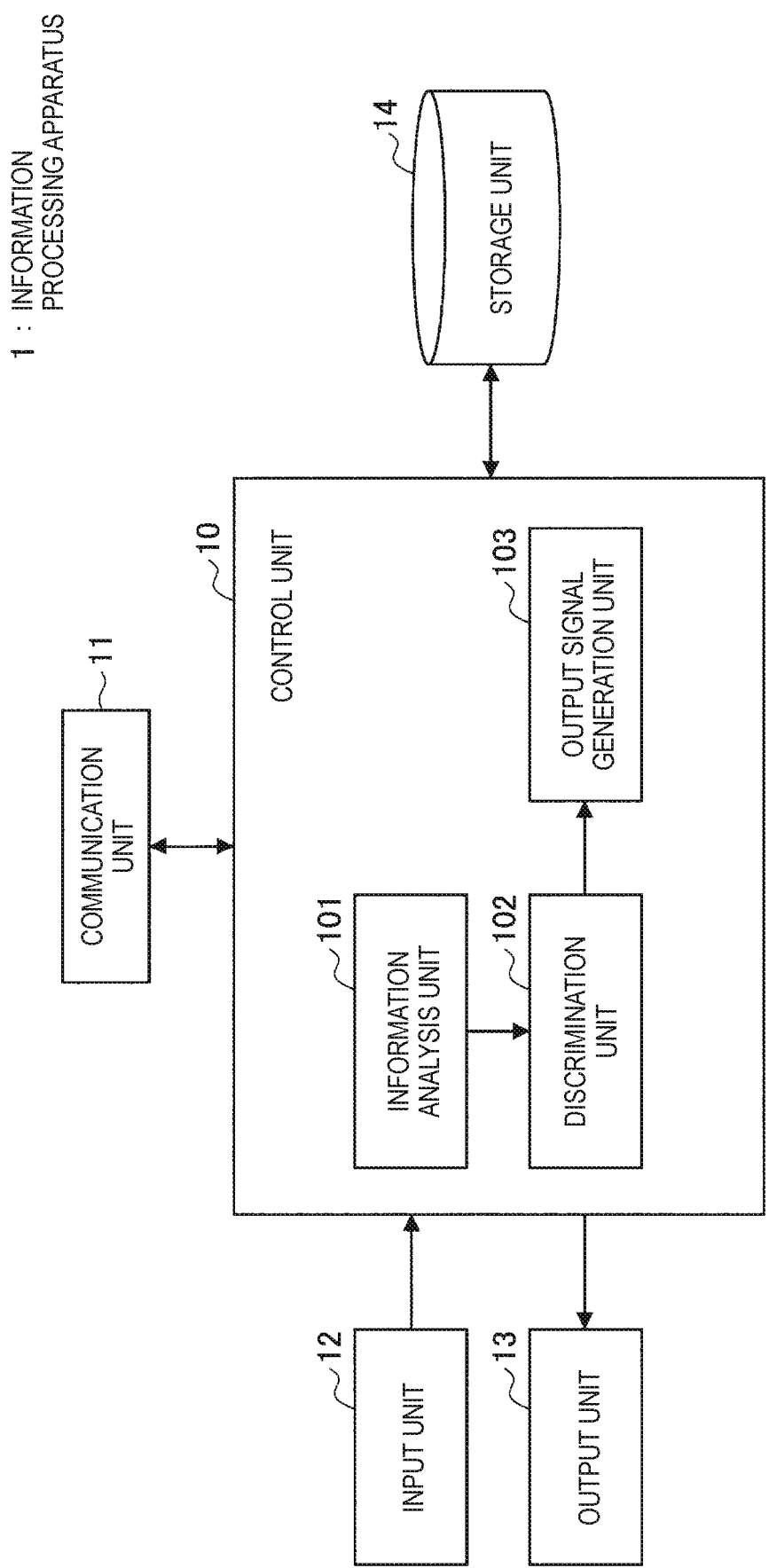
FIG. 6 is a block diagram illustrating an example of a configuration of an information processing apparatus according to the present embodiment.

FIG. 6 is a block diagram illustrating an example of a configuration of the information processing apparatus 1 according to the present embodiment. The information processing apparatus 1 has a control unit 10, a communication unit 11, an input unit 12, an output unit 13, and a storage unit 14 as illustrated in FIG. 6.

The control unit 10 functions as an arithmetic processing device and a control device, and controls overall operations performed within the information processing apparatus 1 in accordance with various programs. The control unit 10 is realized by an electronic circuit, for example, a central processing unit (CPU), a microprocessor, or the like. In addition, the control unit 10 may include a read only memory (ROM) that stores programs to be used, arithmetic parameters, and the like, and a random access memory (RAM) that temporarily stores parameters that change as appropriate, and the like.

In addition, the control unit 10 according to the present embodiment functions also as an information analysis unit 101, a discrimination unit 102, and an output signal generation unit 103.

The information analysis unit 101 analyzes one or a plurality of pieces of sensor data and acquires a plurality of pieces of pointer information on the display screen of the screen 3. Specifically, the information analysis unit 101 specifies coordinates of a position of a pointer on the display screen, and characteristics of the pointer (a combination of a plurality of wavelengths, a shape of a mark, a state during a swing, a state and a trajectory of the mark, and the like). The sensor data is, for example, one or more IR captured images captured by the camera 6.

The discrimination unit 102 discriminates an input device 2 corresponding to each pointer on the basis of characteristics of a plurality of pieces of pointer information acquired by the information analysis unit 101. In the present embodiment, input (e.g., light emission using infrared light) from a number of input devices 2 is performed with respect to one display screen, and the discrimination unit 102 of the information processing apparatus 1 discriminates which pointer on the display screen corresponds to which input device. At this time, the discrimination unit 102 discriminates the input devices 2 using characteristics of the pointer information analyzed by the information analysis unit 101 and output information (e.g., sensor information) from the input devices 2. Specific discrimination methods will be described in detail in each embodiment.

In a case in which a position of a pointer satisfies a predetermined condition, the output signal generation unit 103 generates a predetermined haptic stimulation signal to be output to the input device corresponding to the pointer. Specifically, in a case in which a position or a trajectory of the pointer is superimposed on the stereoscopic object 30, for example, a haptic stimulation signal for causing a user to perceive the input device 2 as having touched the stereoscopic object 30 is generated. At this moment, a haptic stimulation signal for causing the user to perceive a virtual feeling (a texture such as hardness or softness) sensed at the moment when the input device 2 touches the stereoscopic object 30 is generated. In addition, the output signal generation unit 103 may also generate a sound signal for causing the user to perceive a virtual sound at the moment when the input device 2 touches the stereoscopic object 30 together. The generated haptic stimulation signal is output (transmitted) to the corresponding input device 2 from the communication unit 11. In addition, the generated sound signal is output (transmitted) to the corresponding haptic stimulus output device 4 with a speaker.

In addition, in the case in which the position of the pointer satisfies the predetermined condition, the output signal generation unit 103 may further generate a predetermined haptic stimulation signal to be output to the haptic stimulus output device 4 worn by a user carrying the input device 2 corresponding to the pointer. The generated haptic stimulation signal is output to the corresponding haptic stimulus output device 4 from the communication unit 11.

Accordingly, in a case of a virtual game in which users hit the stereoscopic object 30 with the input devices 2, for example, the information processing apparatus 1 according to the present embodiment can present the users with vibration and sounds for causing them to feel virtually as if they were hitting the stereoscopic object 30 with the input devices 2. In addition, the information processing apparatus 1 can also cause the jacket-type haptic stimulus output device 4-2 worn by a user (see FIG. 4) to output predetermined vibration and give an impact made at the moment of hitting to the body of the user. In addition, the information processing apparatus 1 can also cause predetermined vibration for causing the user to feel as if a specific part of the body of the user were being attacked virtually to be output from the jacket-type haptic stimulus output device 4-2 worn by a user, together with a video being output showing that he or she has failed the attack and thus the stereoscopic object 30 is hitting the user or the stereoscopic object 30 is attacking the user.

The communication unit 11 is a communication module for performing transmission and reception of data with another apparatus in a wired or wireless manner. The communication unit 11 wirelessly communicates with external equipment directly or through a network access point using a method, for example, a wired local area network (LAN), a wireless LAN, Wi-Fi (registered trademark), infrared communication, Bluetooth (registered trademark), near field/non-contact communication, or the like. The communication unit 11 according to the present embodiment, for example, transmits the haptic stimulation signal to the input devices 2 or the haptic stimulus output devices 4.

The input unit 12 receives an operation instruction from a manager or the like and outputs the operation details to the control unit 10. The input unit 12 may be a touch sensor provided integrally with a display, a pressure sensor, or a proximity sensor. Alternatively, the input unit 12 may be a physical configuration such as a keyboard, a button, a switch, a lever, or the like. In addition, the input unit 12 may be a microphone.

The output unit 13 is a display that outputs, for example, an operation screen or a menu screen for a manager, or the like. Specifically, for example, a liquid crystal display (LCD), an organic electro-luminescence (EL) display, and the like are exemplified. In addition, the output unit 13 may further include a speaker that outputs sounds.

The storage unit 14 stores programs and parameters for the above-described control unit 10 to execute each function. In addition, the storage unit 14 includes a recording medium, a recording apparatus that records data on a recording medium, a storage apparatus including a reading apparatus that reads data from a recording medium and a deleting apparatus that deletes data recorded on the recording medium, or the like. Note that the storage unit 14 may be a storage medium, for example, a non-volatile memory such as a flash ROM (or a flash memory), an electrically erasable programmable read-only memory (EEPROM), and an erasable programmable ROM (EPROM), a magnetic disk such as a hard disk and a disk-type magnetic disk, an optical disc such as a compact disc (CD), a digital versatile disc recordable (DVD-R), and a Blu-Ray disc (BD; a registered trademark), a magneto-optical (MO) disc, and the like.

Each configuration of the information processing system according to an embodiment of the present disclosure has been described above in detail. Next, each embodiment of the information processing system according to the present embodiment will be described in detail with reference to the drawings.

3. First Embodiment 3-1. Overview

As described above, when the discrimination unit 102 discriminates each pointer on the display screen and the corresponding input device 2 that has emitted light of the pointer, the information processing apparatus 1 according to the present embodiment can give feedback with a predetermined haptic stimulus output to each of the input devices 2 in accordance with an input (i.e., a position or a motion of the pointer) by each input device 2.

Here, specification of a position of a pointer on the display screen and discrimination of association of the pointer with a corresponding IR emitter are possible by using IR emitters with different wavelengths and cameras with band-pass filters corresponding to each of the wavelengths. However, wavelength bands should be separated to a certain degree if accuracy of the filters is taken into account, and about four wavelengths including 800 nm, 850 nm, 900 nm, and 950 nm are the limit, thus only four IR emitters can be discriminated, and therefore it is not possible to identify a number of people at the same time.

Figure 7:
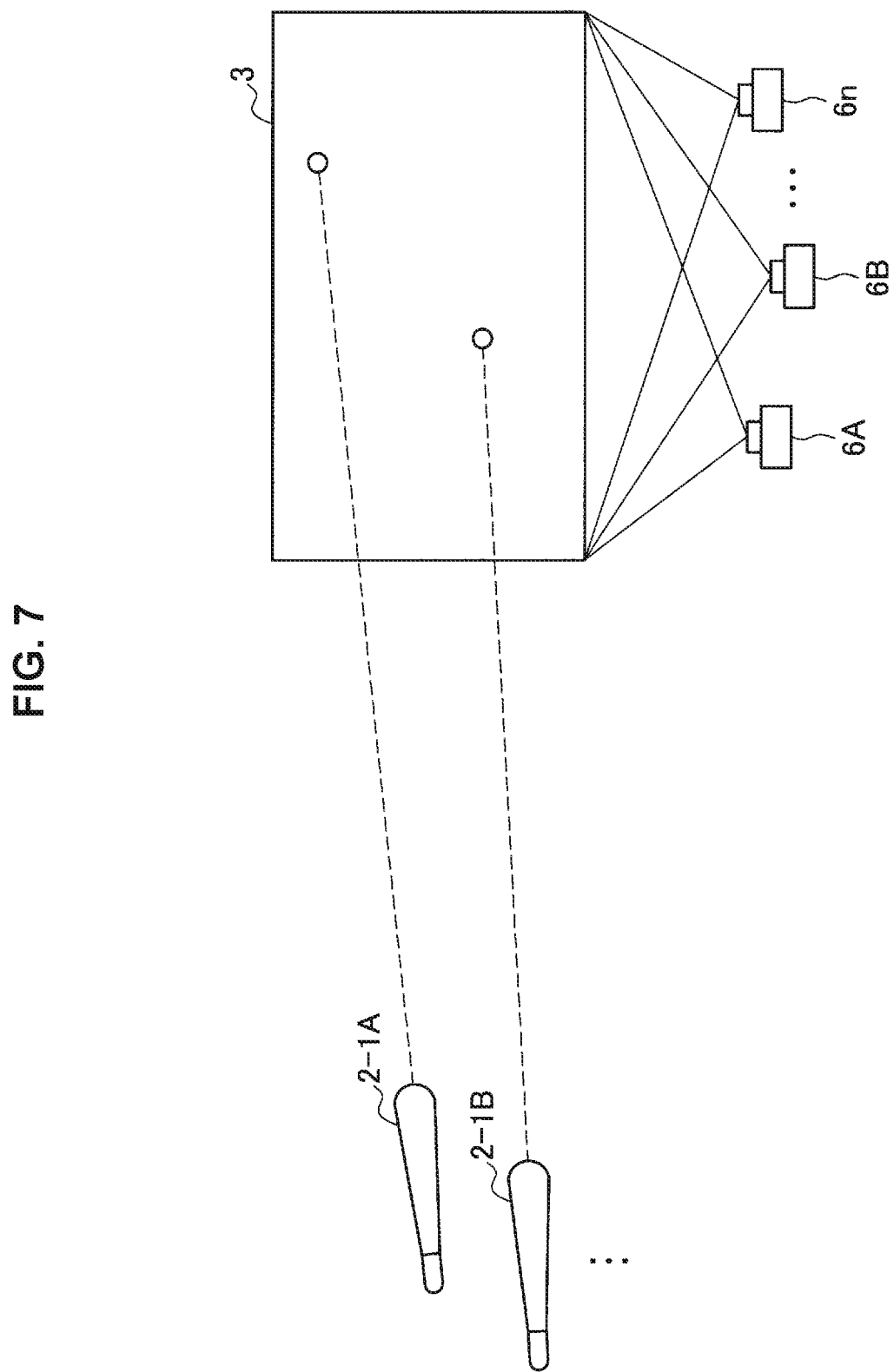
FIG. 7 is a diagram for describing an overview of an information processing system according to a first embodiment.

Therefore, in a first embodiment, a number of people can be identified at the same time using input devices that emit light with one or a plurality of IR wavelengths among n types of IR wavelengths and cameras each with n-wavelength band-pass filters. FIG. 7 is a diagram for describing an overview of an information processing system according to the first embodiment.

In the present embodiment, a number of input devices 2-1 (2-1A, 2-1B, . . . ) that emit light with one or a plurality of IR wavelengths and cameras 6A to 6n each with band-pass filters for different wavelengths that capture the screen 3 are used as illustrated in FIG. 7.

The information processing apparatus 1 according to the present embodiment analyzes each of captured images output from the cameras 6A to 6n and discriminates the input devices 2 corresponding to respective pointers on a display screen. In a case in which n types of wavelengths are used in the present embodiment, $2^n-1$ people can be identified by including the input devices 2 that emit light with a plurality of IR wavelengths in the system.

3-2. Configuration of Input Device

Figure 8:
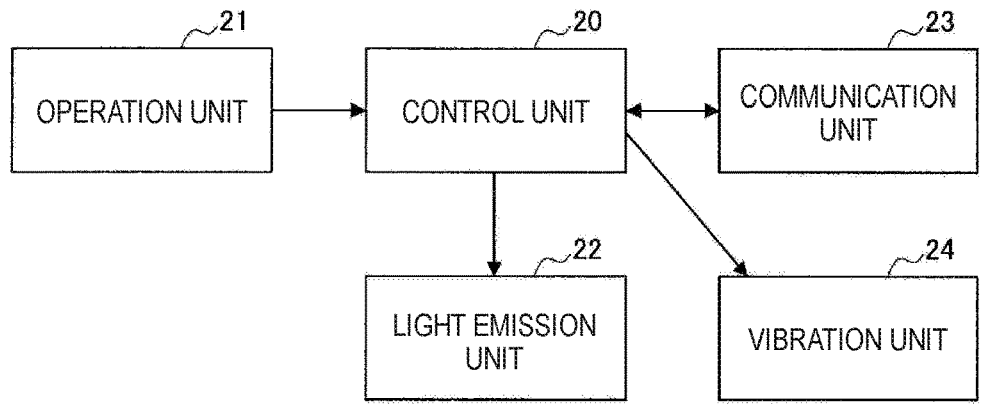
FIG. 8 is a block diagram illustrating an example of a configuration of an input device according to the first embodiment.

First, a configuration of an input device 2-1 according to the present embodiment will be described with reference to FIG. 8. FIG. 8 is a block diagram illustrating an example of a configuration of the input device 2-1 according to the present embodiment. The input device 2-1 has a control unit 20, an operation unit 21, a light emission unit 22, a communication unit 23, and a vibration unit 24 as illustrated in FIG. 8.

The control unit 20 functions as an arithmetic processing device and a control device, and controls overall operations of the input device 2-1 in accordance with various programs. The control unit 20 is realized by an electronic circuit, for example, a CPU, a microprocessor, or the like. In addition, the control unit 20 may include a ROM that stores programs to be used, arithmetic parameters, and the like, and a RAM that temporarily stores parameters that change as appropriate, and the like.

The control unit 20 according to the present embodiment controls, for example, ON/OFF of light emission of the light emission unit 22 in accordance with an operation from the operation unit 21 or controls a vibration output of the vibration unit 24 in accordance with a haptic stimulation signal transmitted from the information processing apparatus 1 via the communication unit 23.

The operation unit 21 switches between ON and OFF of a power supply of the input device 2-1 and ON and OFF of light emission by the light emission unit 22 in accordance with a user operation. The operation unit 21 is realized by, for example, a switch, a button, a lever, a touch sensor, a pressure sensor, and the like.

The light emission unit 22 emits invisible light rays such as infrared light rays. The light emission unit 22 according to the present embodiment has a function of emitting light with, for example, n types of IR wavelengths.

The communication unit 23 is connected to the information processing apparatus 1 in a wired or wireless manner and performs transmission and reception of data. For example, the communication unit 23 receives a haptic stimulation signal from the information processing apparatus 1.

The vibration unit 24 is a small vibration actuator that outputs a vibration stimulus that is an example of a haptic stimulus. The vibration unit 24 includes a single or a plurality of vibration actuators.

3-3. Operation Process

Figure 9:
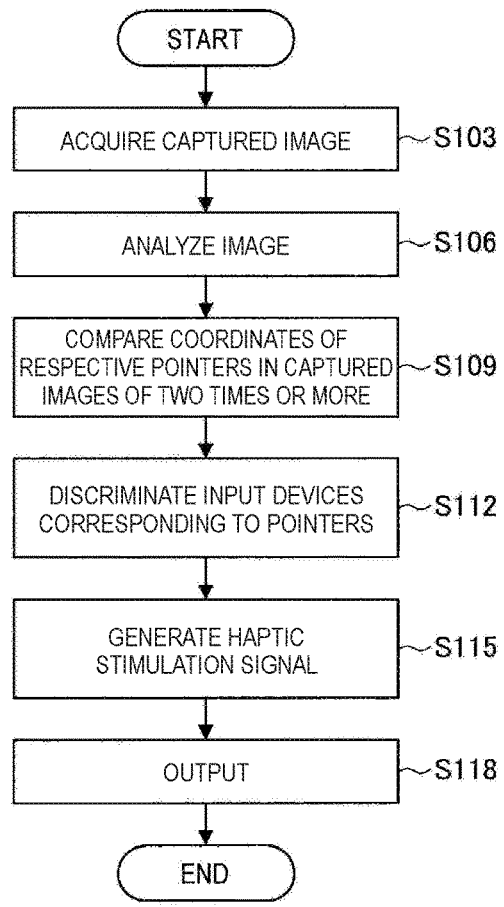
FIG. 9 is a flowchart illustrating an operation process according to the first embodiment.

Next, an operation process according to the first embodiment will be described with reference to FIG. 9. FIG. 9 is a flowchart illustrating an operation process according to the present embodiment.

First, the information processing apparatus 1 acquires each of images captured by the cameras 6A to 6n (Step S103) as shown in FIG. 9.

Next, the information analysis unit 101 of the information processing apparatus 1 performs image analysis of the captured images and specifies coordinates of positions of pointers (light emission points) (Step S106).

Next, the discrimination unit 102 of the information processing apparatus 1 compares the coordinates of respective pointers in two or more captured images with each other (Step S109) and discriminates input devices corresponding to the pointers (Step S112), A technique of comparing coordinates of pointers and discriminating corresponding input devices will be described below with reference to FIGS. 10 and 11.

Figure 10:
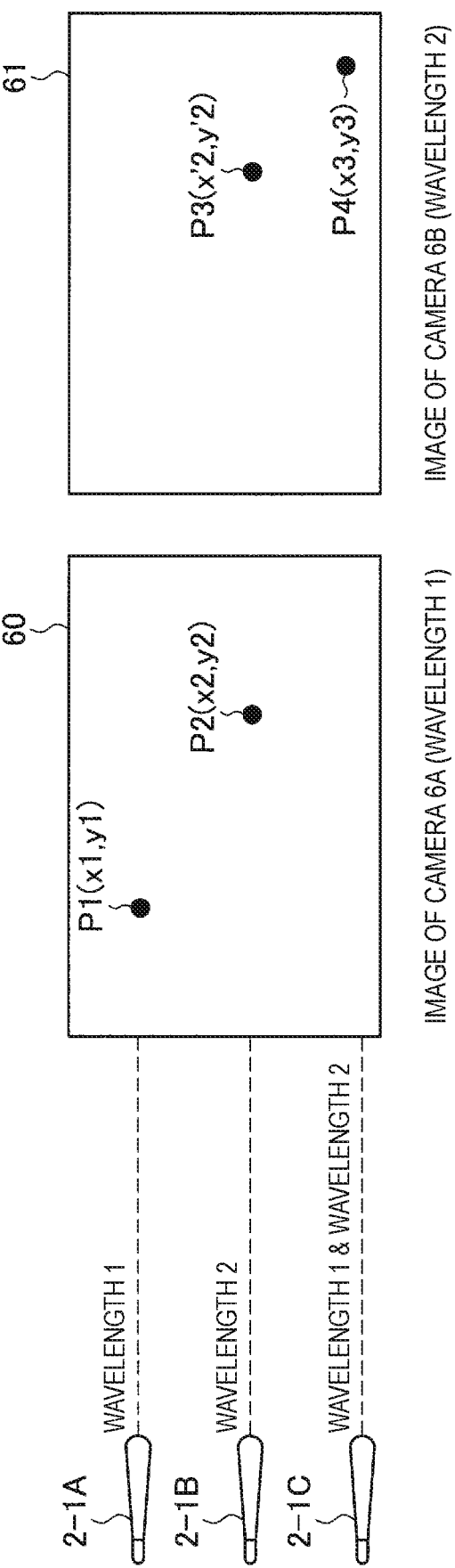
FIG. 10 is a diagram for describing a case in which three input devices are discriminated using two types of wavelengths in the first embodiment.

FIG. 10 is a diagram for describing a case in which three input devices are discriminated using two types of wavelengths. In the example illustrated in FIG. 10, IR with a wavelength 1 is emitted from the input device 2-1A, IR with a wavelength 2 is emitted from the input device 2-1B, and IR with the wavelength 1 and the wavelength 2 is emitted from the input device 2-1C. In addition, in FIG. 10, a captured image 60 captured by the camera 6A with a band-pass filter for the wavelength 1 and a captured image 61 captured by the camera 6B with a band-pass filter for the wavelength 2 are shown.

The discrimination unit 102 compares pointer coordinates P1 (x1, y1) and P2 (x2, y2) of the captured image 60 with P3 (x'1, y'1) and P4 (x3, y3) of the captured image 61 specified by the information analysis unit 101, respectively, and discriminates that the pointer on substantially the same coordinates in the plurality of captured images is from the input device 2-1C emitting the plurality of types of corresponding IR wavelengths. Information of the wavelengths of IR emission by each of the input devices 2-1 is registered in, for example, the storage unit 14 in advance.

An example of a calculation formula for determining the substantially same coordinates is as follows. Here, a calculation formula used in a case of comparison of P2 (x2, y2) with P3 (x'1, y'1) is shown as an example. The discrimination unit 102 determines that both indicate substantially the same coordinates in a case in which the following formula is satisfied, and discriminates that the input device 2-1C emitting IR of the wavelength 1 and the wavelength 2 is the corresponding input device.

$$\text{if } \sqrt{(x_2-x'_2)^2+(y_2-y'_2)^2}<\varepsilon \quad \text{[Math. 1]}$$

FIG. 11 is a diagram for describing an example of a combination of light emission wavelengths of respective input devices in a case in which three types of wavelengths are used. As illustrated in FIG. 11, in a case in which three types of IR wavelengths including a wavelength 1, a wavelength 2, and a wavelength 3 are used, seven input devices including the input devices 2-1A to 2-1G, that is, seven people, can be identified. In this case, the camera 6A with a band-pass filter for the wavelength 1, the camera 6B with a band-pass filter for the wavelength 2, and the camera 6C with a band-pass filter for the wavelength 3 are used as IR cameras.

In addition, although not illustrated, in a case in which four types of IR wavelengths are used, 15 input devices, that is, 15 people, can be identified.

The technique of discriminating the input devices 2-1 has been described above in detail.

Next, in a case in which a position of a specified pointer satisfies a predetermined condition, the output signal generation unit 103 of the information processing apparatus 1 generates a predetermined haptic stimulation signal to be output to the input device 2-1 corresponding to the pointer (Step S115). In a case in which a pointer is superimposed on the stereoscopic object 30, for example, the output signal generation unit 103 generates a haptic stimulation signal for causing a user to perceive the input device 2-1 as having touched the stereoscopic object 30.

Then, the information processing apparatus 1 transmits the generated haptic stimulation signal to the target input device 2-1 using the communication unit 11 and causes the haptic stimulus to be output from the input device 2-1 (Step S118).

3-4. Others

Although $2^n-1$ people can be identified using n types of wavelengths in the above-described example, a larger number of people can be further identified by giving pointer characteristics as follows.
(Shape of Mark)

The number of discriminated input devices can be further increased using, for example, shapes of marks, sizes of the marks, orientations of the marks, arrangement of point light sources, letters using line light sources of pointers, and the like. FIG. 12 is a diagram for describing a case in which nine input devices are discriminated using two types of wavelengths.

In the example illustrated in FIG. 12, the input devices 2-1A to 2-1C emitting light with a wavelength 1 each irradiate a first to third marks, the input devices 2-1D to 2-1F emitting light with a wavelength 2 each irradiate the first to third marks, and the input devices 2-1G to 2-1I emitting light with the wavelength 1 and the wavelength 2 each irradiate the first to third marks.

The discrimination unit 102 discriminates each of the input devices 2-1 on the basis of positions of pointer coordinates P11 to 16 of a captured image 62 captured by the camera 6A with the band-pass filter for the wavelength 1 and pointer coordinates P17 to P22 of a captured image 63 captured by the camera 6B with the band-pass filter for the wavelength 2, and shapes of the marks. Information of the light emission wavelengths of the respective input devices 2-1 and the shapes of the marks is stored in, for example, the storage unit 14 in advance.

The discrimination unit 102 can discriminate, for example, the input devices 2-1A to 2-1C of the pointer coordinates P11 to P13 in the captured image 62 and the input devices 2-1D to 2-1F of the pointer coordinates P17 to P19 in the captured image 63 using differences in corresponding wavelengths and shapes of the marks. In addition, the discrimination unit 102 can discriminate the corresponding input devices 2-1G to 2-1I since the pointer coordinates P14 to P16 in the captured image 62 each have substantially the same coordinates and the same shapes of marks as the pointer coordinates P20 to P22 in the captured image 63.
(Characteristics During Swing)

The discrimination unit 102 can recognize a difference in states of light emission trajectories of pointers even during swings of the input devices 2 and discriminate the input devices. If pointers are in a stationary state, each shape of marks can be recognized as illustrated in FIG. 12, however, since blur may occur in accordance with an exposure time during a swing, light emission trajectories vary in accordance with different shapes and sizes of the marks. The discrimination unit 102 can discriminate corresponding input devices on the basis of pointer characteristics such as thicknesses or main lines of light emission trajectories, and a direction of a swing.
(State of Mark)

In addition, corresponding input devices 2-1 can be discriminated also by varying magnitudes of luminance values of IR emitted from each of the input devices 2-1 (i.e., difference in brightness).

In addition, the corresponding input devices 2-1 can be discriminated using a difference in flickering patterns by causing IR emitted from each of the input devices 2-1 to flicker.
(Use of High Frame Rate Camera)

The information processing apparatus 1 synchronizes light emission timings of the input devices 2-1 with shutter timings of the cameras 6 to cause each of pointers to appear only in frames at every specific multiple time, and thereby can discriminate a plurality of input devices 2-1 even in a case in which a single wavelength is used. Details thereof will be described below with reference to FIG. 13.

Figure 13:
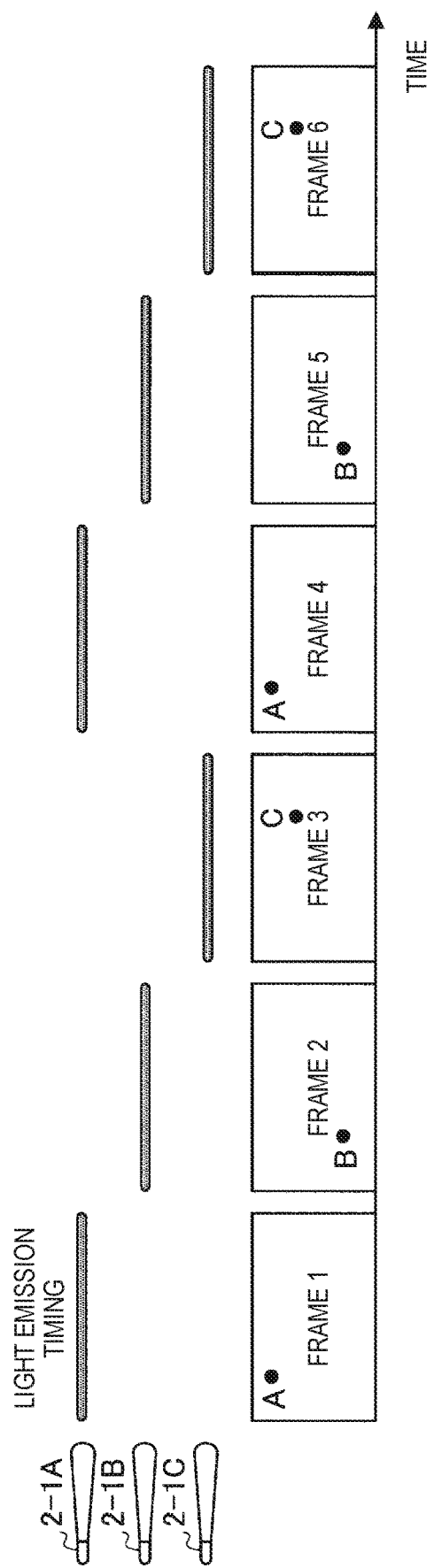
FIG. 13 is a diagram for describing an input device discrimination method in a case in which a high frame rate camera is used according to the first embodiment.

FIG. 13 is a diagram for describing an input device discrimination method in a case in which a high frame rate camera is used according to the present embodiment. The information processing apparatus 1 synchronizes timings at which light is emitted from each of the input devices 2-1 with timings at which the cameras 6 capture the display screen to perform control such that each of pointers appears only in frames at every specific multiple time as illustrated in FIG. 13. Accordingly, the discrimination unit 102 of the information processing apparatus 1 can discriminate such that, for example, a pointer A appearing in frame 1 acquired at a timing at which the input device 2-1A emits light corresponds to the input device 2-1A and a pointer B appearing in frame 2 acquired at a timing at which the input device 2-1B emits light corresponds to the input device 2-1A.
(Combination in Each Technique)

The number of input devices 2-1 to be discriminated can be increased further using a combination of patterns of each of above-described techniques. For example, a combination of a plurality of wavelengths as in the above-described embodiment is conceivable.

(Combination of Different Techniques)

The number of input devices 2-1 to be discriminated can be increased further using a combination of above-described different techniques. For example, in a case in which two types of IR wavelengths are used, identification of more number of people can be handled by combining a number of identifications using shapes, sizes, brightness, flickering of a mark, and the like.

4. Second Embodiment

Next, an information processing system according to a second embodiment will be described with reference to FIGS. 14 to 20. In the present embodiment, sensors that sense motions and attitudes are further provided in the input devices 2-2 with an IR emission function, and input devices 2-2 corresponding to each of pointers are discriminated on the basis of motions of the input devices 2-2 and captured images by the cameras 6 on a display screen.

4-1. Configuration of Input Device

Figure 14:
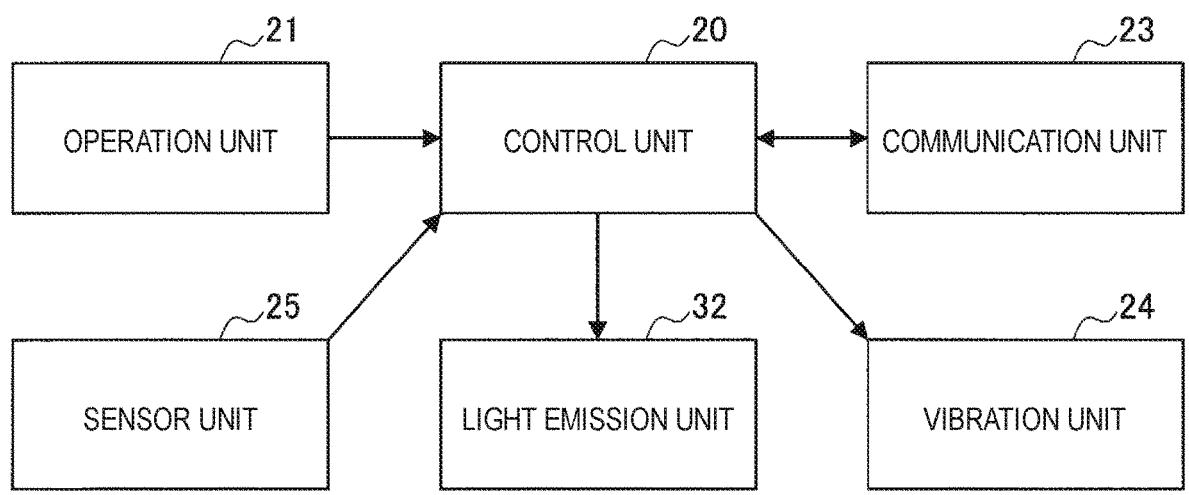
FIG. 14 is a block diagram illustrating an example of a configuration of an input device according to a second embodiment.

FIG. 14 is a block diagram illustrating an example of a configuration of an input device 2-2 according to the present embodiment. The input device 2-2 has a control unit 20, an operation unit 21, a light emission unit 22, a communication unit 23, a vibration unit 24, and a sensor unit 25 as illustrated in FIG. 14. Here, parts different from the input devices 2-1 according to the first embodiment will be described, and description of common parts will be omitted.

The control unit 20 performs control such that sensor information sensed by the sensor unit 25 is transmitted to an information processing apparatus 1 via the communication unit 23, in addition to control over the light emission unit 22 and the vibration unit 24.

The sensor unit 25 has sensors that sense motions and attitudes of the input device 2-2, and may be, for example, a 6-axis sensor (specifically, an acceleration sensor and a gyro sensor) and an attitude sensor (specifically, a geomagnetic sensor). Note that, the 6-axis sensor and the attitude sensor are an example of the sensor unit 25, sensors are not limited thereto, at least one of an acceleration sensor, a gyro sensor, or a geomagnetic sensor, for example, may be used, and a velocity sensor, a vibration sensor, or the like may be further used.

4-2. Operation Process

Figure 15:
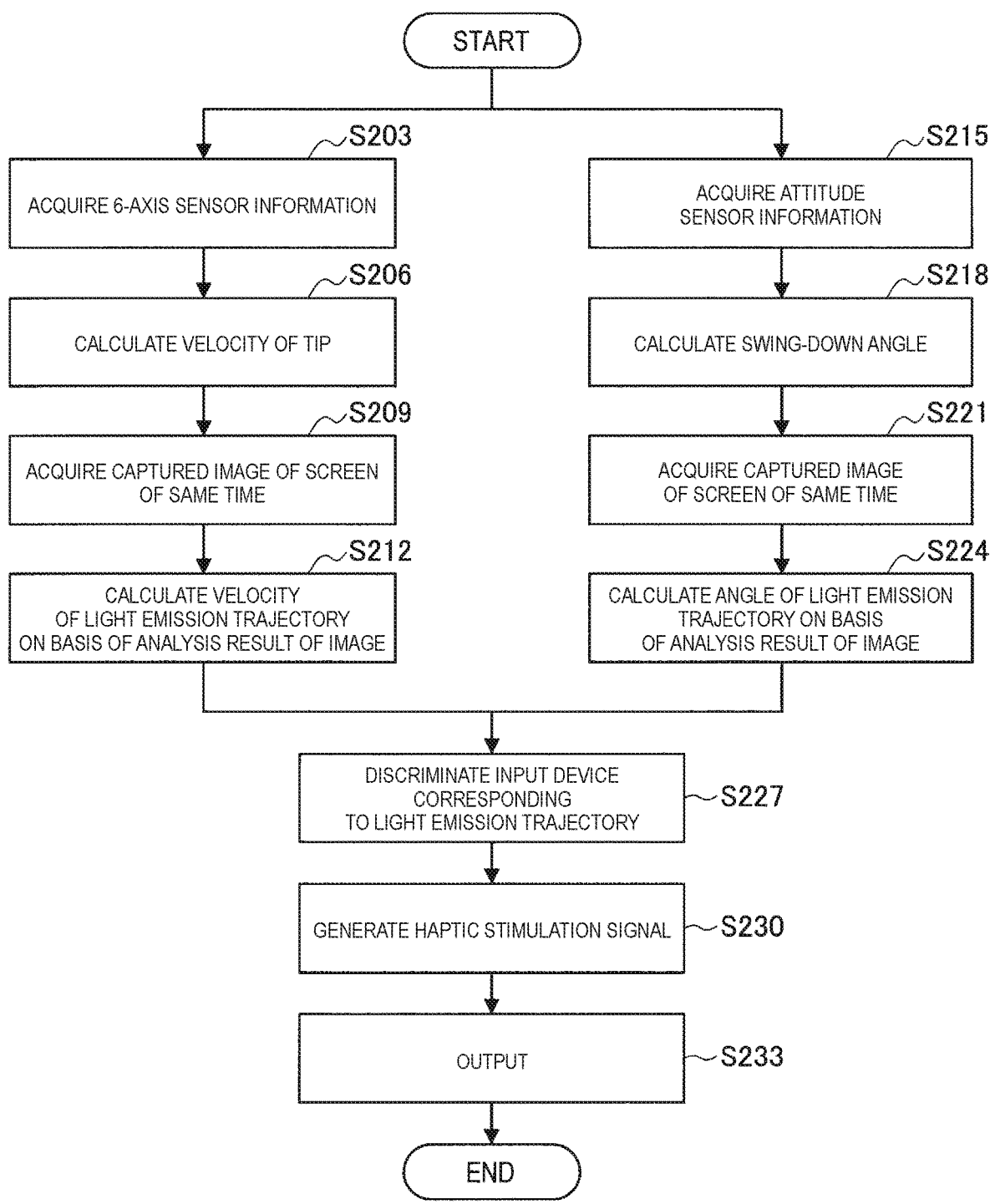
FIG. 15 is a flowchart showing an operation process according to the second embodiment.

Next, an operation process of the present embodiment will be described. FIG. 15 is a flowchart showing an operation process according to the present embodiment.

First, the information processing apparatus 1 acquires 6-axis sensor information sensed by the sensor unit 25 provided at the tip of the input device 2-2 (Step S203), and the discrimination unit 102 calculates a velocity v of the tip of the input device 2-2, as illustrated in FIG. 15. The input device 2-2 continuously transmits the sensor information sensed by the sensor unit 25 to the information processing apparatus 1. Here, FIG. 16 illustrates a diagram for describing the calculation of a velocity using a discrimination technique of the present embodiment. The sensor unit 25 is provided at the tip of the input device 2-2 as illustrated in FIG. 16. A user swings the input device 2-2 simulating the shape of a weapon such as a club and carries out an attack or the like against a front stereoscopic object (not illustrated in FIG. 16) projected on the screen 3. At this moment, the discrimination unit 102 calculates a velocity v of the tip of the input device 2-2 using the following formula on the basis of the 6-axis sensor information (specifically, an angular velocity) and a length l of the input device 2-2.

$$v = \frac{\Delta l \theta}{\Delta t} \qquad \text{[Math. 2]}$$

Next, the information processing apparatus 1 acquires, from the camera 6, the captured image of the screen 3 captured at the substantially same time as the time at which the 6-axis sensor information used to calculate the velocity of the tip was sensed (Step S209).

Next, the discrimination unit 102 calculates a velocity V of a light emission trajectory on the basis of an analysis result of the acquired captured image by the information analysis unit 101 (Step S212). Since IR is emitted from the tip of the input device 2-2, when the user swings down the input device 2-2 against the screen 3, a light emission trajectory 31 by IR is generated on the screen 3 as illustrated in FIG. 16. The discrimination unit 102 calculates the velocity V of the light emission trajectory on the basis of the length of the light emission trajectory 31 in the IR captured image at the timing of the swing-down (the length from the starting point to the end point) and the time (the movement time of the pointer from the start point to the end point).

Meanwhile, the information processing apparatus 1 acquires attitude sensor information of the same time (the timing at which the input device 2-2 was swung down) sensed by the sensor unit 25 provided at the tip of the input device 2-2 (Step S215), and the discrimination unit 102 calculates a swing-down angle φ of the tip of the input device 2-2.

Next, the information processing apparatus 1 acquires, from the camera 6, the captured image of the screen 3 captured at the substantially same time as the time at which the attitude sensor information used to calculate the swing-down angle was sensed (Step S221).

Next, the discrimination unit 102 calculates an angle Φ of the light emission trajectory on the basis of an analysis result of the acquired captured image by the information analysis unit 101 (Step S224).

Here, FIG. 17 illustrates a diagram for describing calculation of an angle using the discrimination technique of the present embodiment. The light emission trajectory 31 appears in an IR camera image 65 captured by the camera 6 as illustrated in the upper part of FIG. 17, and thus the discrimination unit 102 can calculate the angle Φ of the light emission trajectory 31 at the time of a swing-down on the basis of the analysis result of the image. In addition, a diagram in which the moment of the user's swing-down of the input device 2-2 is viewed from the back side is illustrated in the lower part of FIG. 17. The discrimination unit 102 calculates an angle Φ of the moment at which the input device 2-2 was swung down on the basis of the attitude sensor information sensed by the sensor unit 25 provided in the input device 2-2.

Next, the discrimination unit 102 discriminates the input device 2-2 corresponding to the light emission trajectory on the basis of the velocity of the tip and the velocity of the light emission trajectory 31 at the time of the operation of the input device 2-2, and the angle of the input device 2-2 and the angle of the light emission trajectory 31 at the time of the operation of the input device 2-2 (Step S227). Although only one input device 2-2 and one light emission trajectory 31 are illustrated in FIGS. 16 to 17 for the sake of convenience of description, actually a number of users carry the input devices 2-2 and operate the input devices 2-2 by swinging them against the stereoscopic object 30 appearing on the screen 3 as illustrated in FIGS. 1 and 2, and thus it is assumed that a number of emission trajectories 31 are generated on IR camera images 65 of the same time in which the screen 3 is captured. The discrimination unit 102 compares the velocity and the angle of each input device 2-2 at the time of operation and the velocity and the angle of each light emission trajectory respectively, and discriminates the input device 2-2 corresponding to the light emission trajectory. More specifically, in a case in which the following formula is satisfied, for example, the discrimination unit 102 determines that the input device 2-2 corresponds to the light emission trajectory. The left side of the following formula is based on the fact that the velocity V of the light emission trajectory 31 in accordance with the velocity v of the tip of the input device 2-2 can be inferred taking a distance L from the position of the user to the screen 3 into consideration in a case in which the range of the position of the user is already known.

$$\left| V - \frac{L}{l} v \right| < \varepsilon_1 \text{ AND } |\Phi - \varphi| < \varepsilon_2 \qquad \text{[Math. 3]}$$

Next, in a case in which a position and a motion of the specified light emission trajectory satisfy predetermined conditions, the output signal generation unit 103 of the information processing apparatus 1 generates a predetermined haptic stimulation signal to be output to the input device 2-2 corresponding to the light emission trajectory (Step S230). In a case in which the light emission trajectory is superimposed on the stereoscopic object 30, for example, the output signal generation unit 103 generates a haptic stimulation signal for causing the user to perceive the input device 2-2 as having the stereoscopic object 30.

Then, the information processing apparatus 1 transmits the generated haptic stimulation signal to the target input device 2-2 using the communication unit 11 and causes the haptic stimulus to be output from the input device 2-2 (Step S233).

The operation process according to the second embodiment has been described above in detail. Note that, although the accuracy of discrimination is increased by using both conditions of velocities and angles in the above-described operation process, the present embodiment is not limited thereto, discrimination can be made under only one of the conditions.

In addition, as a discrimination technique based on an operation velocity of an input device, a velocity V' that is not dependent on the length 1 is calculated and thus a corresponding input device 2-2 can be discriminated as well. This technique will be described below with reference to FIG. 18.

Figure 18:
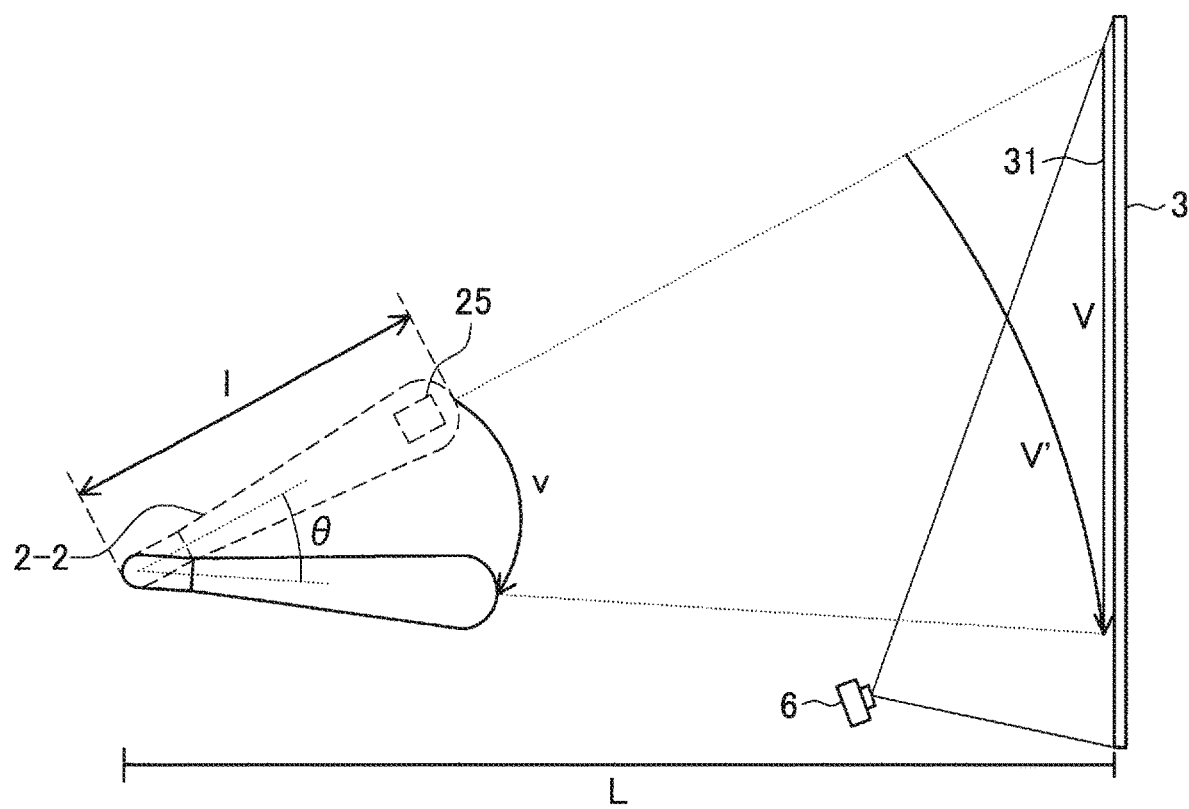
FIG. 18 is a diagram for describing another example of calculation of a velocity using the discrimination technique of the second embodiment.

FIG. 18 is a diagram for describing another example of the calculation of a velocity using the discrimination technique of the present embodiment. In a case in which the range of a position of a user is known as illustrated in FIG. 18, the discrimination unit 102 can obtain the velocity V' that is not dependent on the length of the input device 2-2 using the following formula, taking a distance L from a position of the user to the screen 3 and 6-axis sensor information (specifically, an angular velocity) sensed by the sensor unit 25 provided in the input device 2-2 into consideration.

$$V' = \frac{\Delta \theta}{\Delta t} L \qquad \text{[Math. 4]}$$

Then, in a case in which the following formula is satisfied for the same time, the discrimination unit 102 determines that the input device 2-2 corresponds to the light emission trajectory.

$$\left| V - \frac{L}{l} v \right| < \varepsilon_1 \text{ OR } |V - V'| < \varepsilon_2 \qquad \text{[Math. 5]}$$

4-3. First Modified Example

Although the discrimination technique using sensor information sensed by the sensor unit 25 of the input device 2-2 has been described in the above-described example, the present embodiment is not limited thereto. For example, by preparing IR cameras that photograph the user side and using captured images captured by the IR cameras, input devices corresponding to emission trajectories can be discriminated without using sensor information of the sensor unit 25. Details of the operation will be described below with reference to FIGS. 19 to 20.

Figure 19:
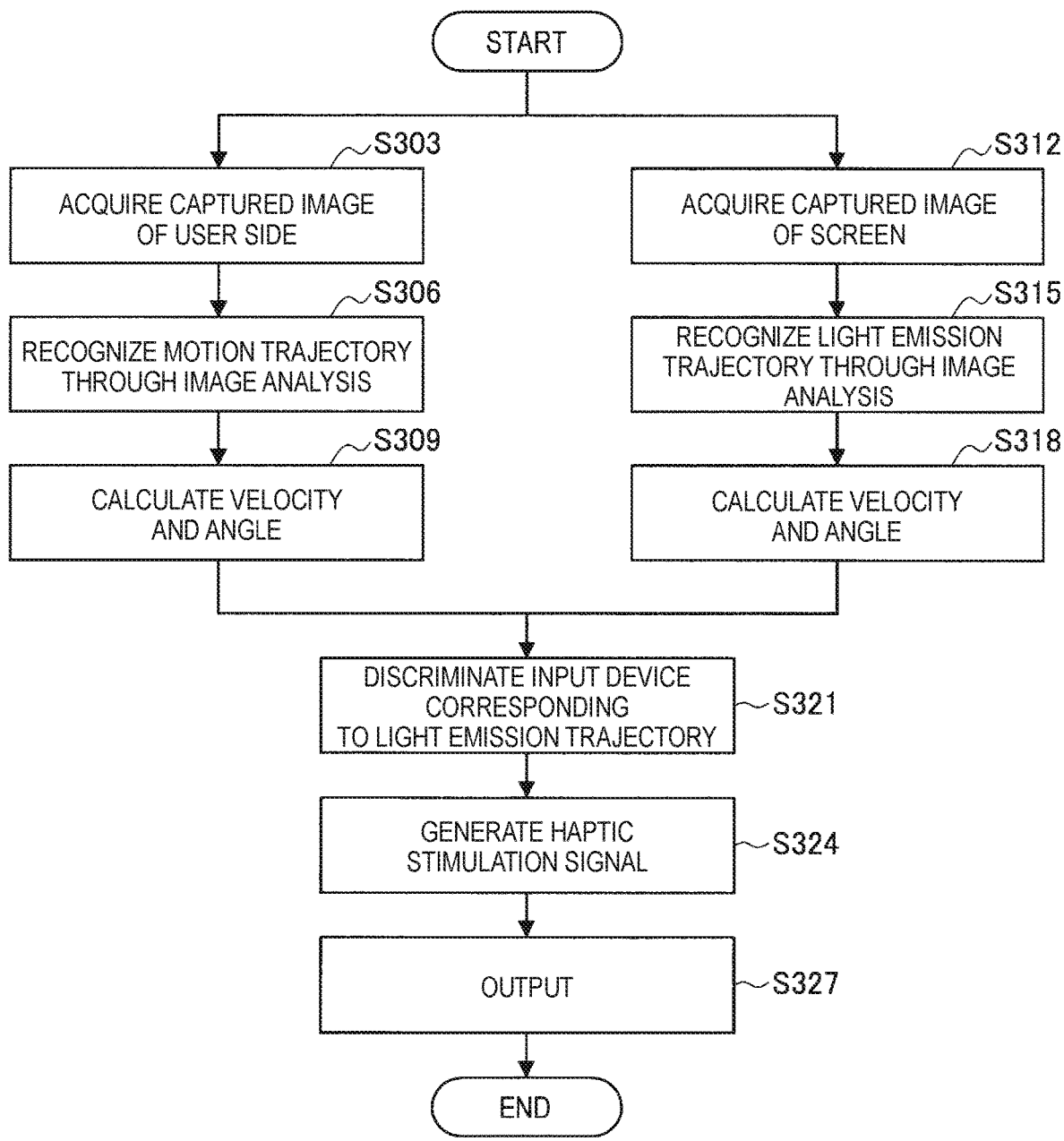
FIG. 19 is a flowchart showing an operation process according to a first modified example of the second embodiment.
Figure 20:
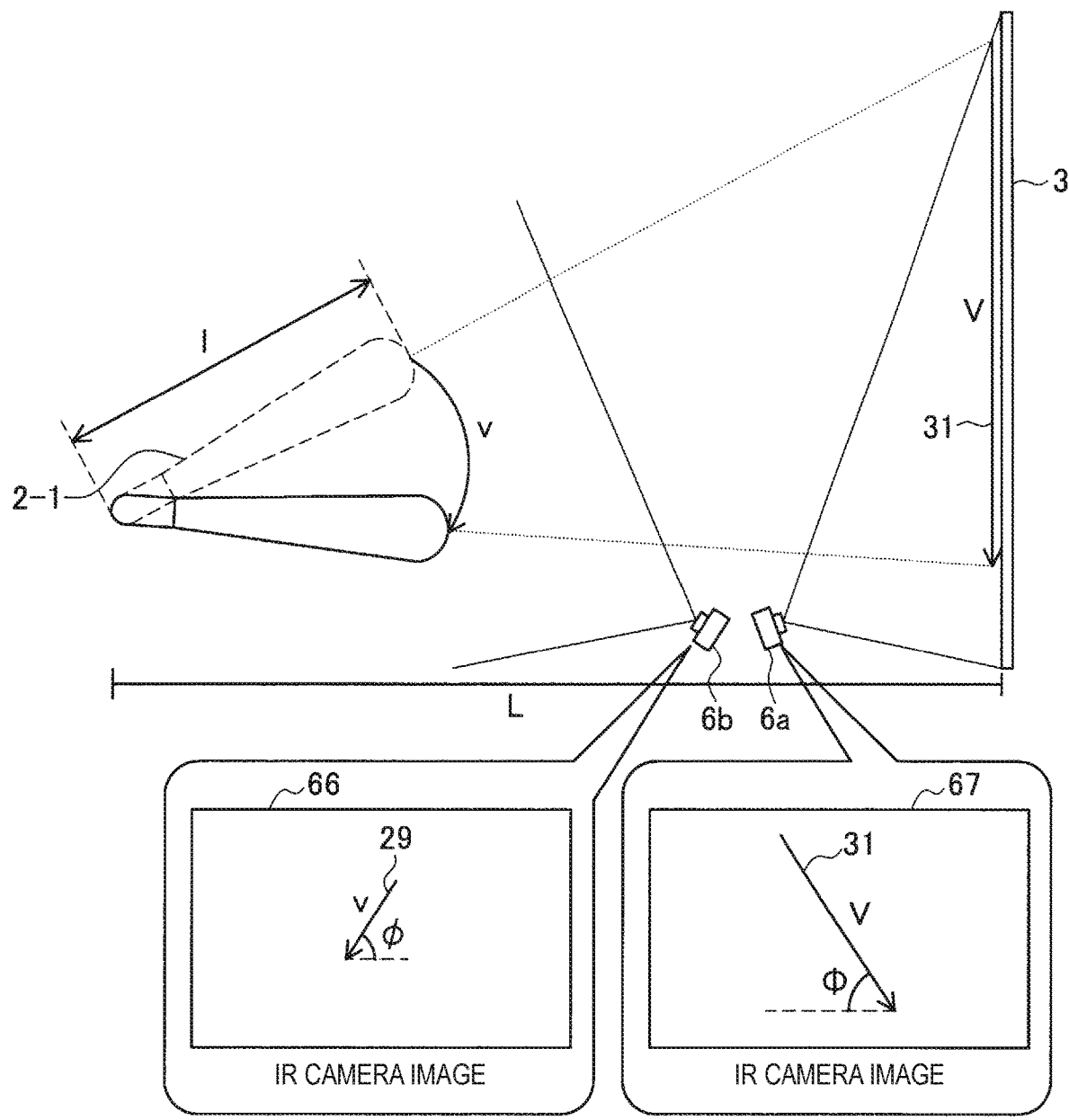
FIG. 20 is a diagram for describing calculation of a velocity and an angle in a discrimination technique according to the first modified example of the second embodiment.

FIG. 19 is a flowchart showing an operation process according to a first modified example of the second embodiment. First, the information processing apparatus 1 acquires a captured image (an IR camera image 67) captured by a camera 6b (e.g., an IR camera) that captures motions of a user from the front (Step S303) as shown in FIG. 19. Here, FIG. 20 illustrates a diagram for describing calculation of a velocity and an angle in a discrimination technique according to the first modified example. In the present modified example, a camera 6a (an IR camera) that captures a screen 3 and the camera 6b (another IR camera) that captures a motion of a user (i.e., a motion of the input device 2-1) from the front are disposed as illustrated in FIG. 20. A configuration of an input device 2-1 is similar to that of the first embodiment described with reference to FIG. 8, and a light emission unit 22 that emits IR is provided at the tip thereof.

Next, the information analysis unit 101 analyzes a captured image (an IR camera image 66) acquired from the camera 6b and recognizes a motion trajectory of the input device 2-1 (Step S306). The motion trajectory of the input device 2-1 is, for example, a trajectory of the tip of the input device 2-1.

Next, the discrimination unit 102 calculates the velocity and the angle of the motion trajectory on the basis of the analysis result of the image (Step S309). Specifically, the discrimination unit 102 calculates the velocity v and the angle φ of the motion trajectory 29 recognized in the IR camera image 66 as illustrated in FIG. 20.

Meanwhile, the information processing apparatus 1 acquires a captured image captured by the camera 6a (IR camera) that captures the display screen of the screen 3 (Step S312).

Next, the information analysis unit 101 analyzes the captured image acquired from the camera Ca and recognizes the light emission trajectory (Step S315).

Next, the discrimination unit 102 calculates the velocity and the angle of the light emission trajectory on the basis of the analysis result of the image (Step S318). Specifically, the discrimination unit 102 calculates the velocity V and the angle Φ of the light emission trajectory 31 recognized in the IR camera image 67 as illustrated in FIG. 20.

Next, the discrimination unit 102 discriminates the input device 2-1 corresponding to the light emission trajectory on the basis of the velocity of the tip (i.e., the velocity of the motion trajectory 29) and the velocity of the light emission trajectory 31 at the time of the operation of the input device 2-1, and the angle of the input device 2-1 and the angle of the light emission trajectory 31 (i.e., the velocity of the motion trajectory 29) at the time of the operation of the input device 2-1 (Step S321), Although only one input device 2-1 and one light emission trajectory 31 are illustrated in FIG. 20 for the sake of convenience of description, actually a number of users carry the input devices 2-1 and operate the input devices 2-1 by swinging them against the stereoscopic object 30 appearing on the screen 3 as illustrated in FIGS. 1 and 2, and thus it is assumed that a number of emission trajectories 31 are generated on IR camera images 67 of the same time in which the screen 3 is captured. The discrimination unit 102 compares the velocity and the angle of the motion trajectory of each input device 2-1 and the velocity and the angle of each light emission trajectory respectively, and discriminates the input device 2-1 corresponding to the light emission trajectory. The camera 6b may be disposed for each user, or may capture a plurality of people together. In a case in which a position of a user is roughly specified, an input device corresponding to each motion trajectory can be identified on the basis of, for example, an order of arrangement, or the like.

With regard to discrimination of an input device 2-1 corresponding to a light emission trajectory, more specifically, in a case in which each of a velocity and an angle satisfies the following formula, for example, the discrimination unit 102 determines that the input device 2-1 corresponds to the light emission trajectory 31. The left side of the following formula is based on the fact that the velocity V of the light emission trajectory 31 in accordance with the velocity v of the tip of the input device 2-1 can be inferred by taking the distance L from the position of the user to the screen 3 into consideration in a case in which the range of the position of the user is already known.

$$\left|V - \frac{L}{l}v\right| < \varepsilon_1 \text{ AND } |\Phi - \varphi| < \varepsilon_2 \quad \text{[Math. 6]}$$

Next, in a case in which a position and a motion of the specified light emission trajectory satisfy predetermined conditions, the output signal generation unit 103 of the information processing apparatus 1 generates a predetermined haptic stimulation signal to be output to the input device 2-1 corresponding to the light emission trajectory (Step S324). In a case in which the light emission trajectory is superimposed on the stereoscopic object 30, for example, the output signal generation unit 103 generates a haptic stimulation signal for causing the user to perceive the input device 2-1 as having the stereoscopic object 30.

Then, the information processing apparatus 1 transmits the generated haptic stimulation signal to the target input device 2-1 using the communication unit 11 and causes the haptic stimulus to be output from the input device 2-1 (Step S327).

4-4. Second Modified Example

Although the light emission trajectory on the screen 3 is recognized by analyzing the IR captured image captured by the camera 6 that captures the screen 3 in the above-described example, the present embodiment is not limited thereto. For example, IR sensors can be disposed around a screen 3, and a light emission trajectory on the screen 3 can be inferred on the basis of sensing results of the IR sensors, without using the camera. 6 that captures the screen 3. This operation will be described in detail below with reference to FIGS. 21 to 25.

Figure 21:
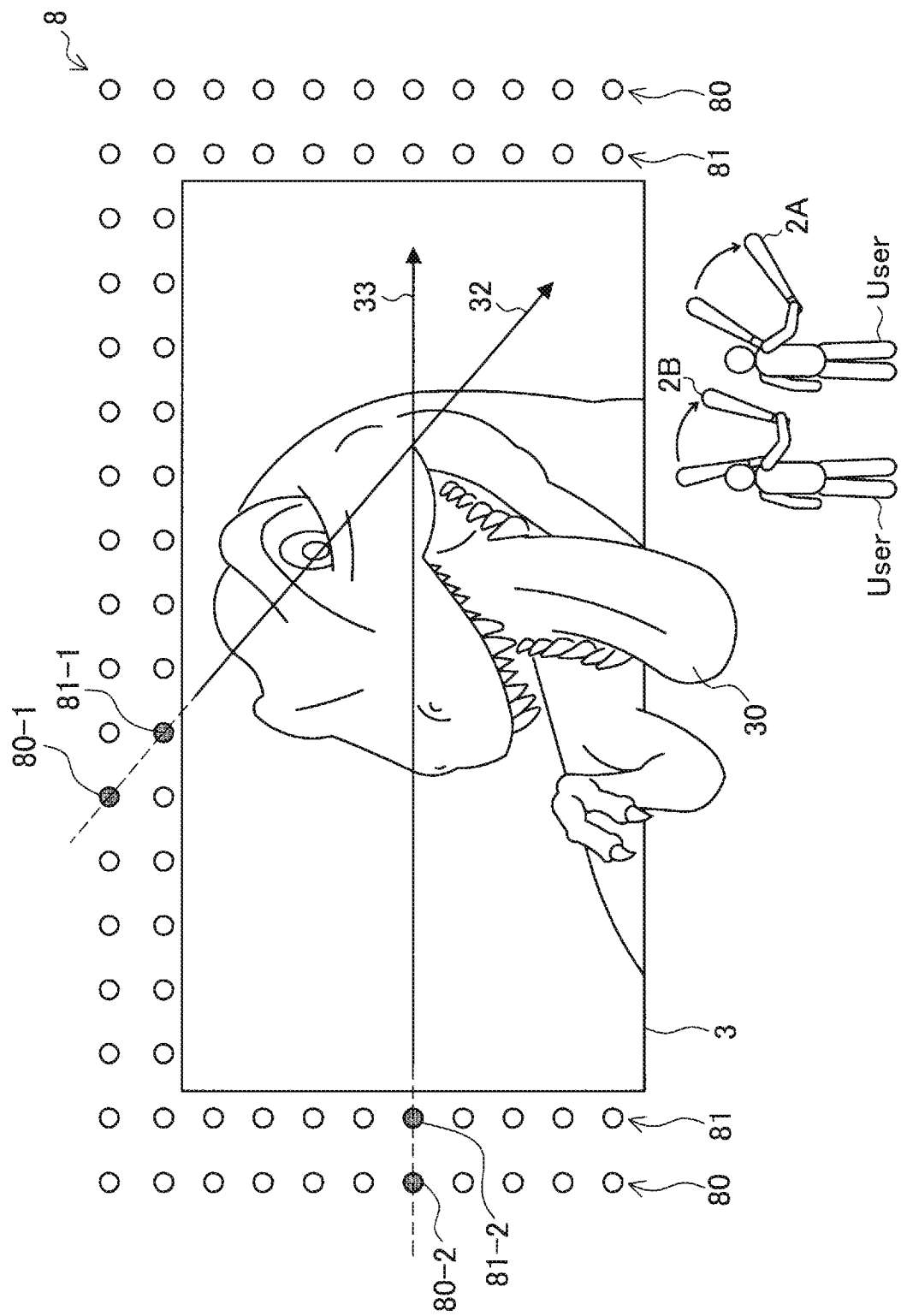
FIG. 21 is a diagram for describing an overview of a second modified example of the second embodiment.

FIG. 21 is a diagram for describing an overview of the present modified example. IR sensors 8 are disposed around a screen 3 as illustrated in FIG. 21. The IR sensors 8 are disposed in, for example, two rows around the screen 3 including an outer IR sensor row 80 and an inner IR sensor row 81. In addition, the IR sensors row 80 and the IR sensor row 81 are disposed on the upper side and both left and right sides of the screen in the example illustrated in FIG. 21. Each IR sensor transmits a sensing result to the information processing apparatus 1.

When a user swings an input device 2A emitting IR toward the screen 3, the swing is sensed by, for example, an outer IR sensor 80-1 and an inner IR sensor 81-1 on the upper side in order. In this case, the control unit 10 of the information processing apparatus 1 infers that a light emission trajectory 32 is generated on the extension line of the line connecting the outer IR sensor 80-1 and the inner IR sensor 81-1.

In addition, when another user swings an input device 213 toward the screen 3, the swing is sensed by, for example, an outer IR sensor 80-2 and an inner IR sensor 81-2 on the left side in order. In this case, the control unit 10 of the information processing apparatus 1 infers that a light emission trajectory 33 is generated on the extension line of the line connecting the outer IR sensor 80-2 and the inner IR sensor 81-2.

A case in which after IR emitted from the input device 2 crosses the screen 3, the IR is sensed sequentially by an inner IR sensor 81-n and an outer IR sensor 80-n is also assumed. In addition, in a case in which a time in which IR is sensed by an outer IR sensor 80-n and then sensed by an inner IR sensor 81-n is long and a motion of the input device 2 is so slow as well, it is considered that the motion is not an operation of an attack against the stereoscopic object 30 or the like. Thus, in a case in which a sensing time $t_1$ of an outer IR sensor 80-n and a sensing time $t_2$ of an inner IR sensor 81-n satisfy the following formula, the control unit 10 may infer a light emission trajectory assuming that the IR has been incident from the side on which these IR sensors are disposed.

$$0 < t_2 - t_1 < T_{th}$$

In the case in which a light emission trajectory is estimated using the IR sensors 8 disposed around the screen 3 as described above, the estimation is based on the result of direct sensing of IR, rather than reflected IR light on the screen 3, and thus the light emission trajectory can be estimated more accurately.

In addition, with regard to discrimination of an input device 2 corresponding to the estimated light emission trajectory, for example, a corresponding input device 2 is discriminated in a case in which, for example, a velocity of the input device 2 (which can be detected using the 6-axis sensor of the input device 2 or calculated by analyzing a captured image in which the user side is captured) is compared with a velocity of the light emission trajectory and the result satisfies the left side of the formula shown in "Math 3" above or the left side of the formula shown in "Math 6" above.

Figure 22:
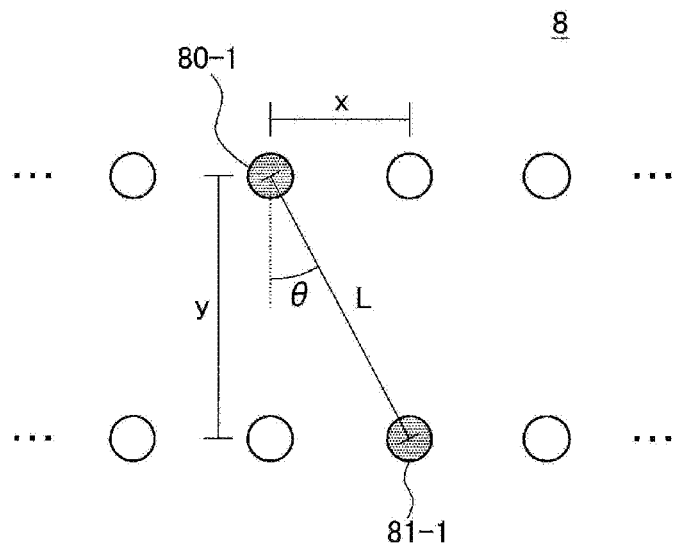
FIG. 22 is a diagram for describing calculation of a velocity of a presumed light emission trajectory according to the present modified example.

Here, calculation of a velocity of the estimated light emission trajectory will be described with reference to FIG. 22. In a case in which IR is sensed sequentially by the outer IR sensor 80-1 and the inner IR sensor 81-1 as illustrated in FIG. 22, a velocity v obtained using the following formula is estimated as the velocity of the light emission trajectory. In the following formula, $t_1$ represents a sensing time of the outer IR sensor 81-1, $t_2$ represents a sensing time of the inner IR sensor 81-1, x represents a separation distance between the outer IR sensor 81-1 and the inner IR sensor 81-1 in the horizontal direction, y represents a separation distance between the outer IR sensor 81-1 and the inner IR sensor 81-1 in the vertical direction, and the distance L represents a direct distance between the outer IR sensor 81-1 and the inner IR sensor 81-1 as illustrated in FIG. 22.

Time $T = t_2 - t_1$ [Math. 7]

Angle $\theta = \arctan(x/y)$

Distance $L = \sqrt{x^2 + y^2}$

Velocity $v = L/T$

Figure 23:
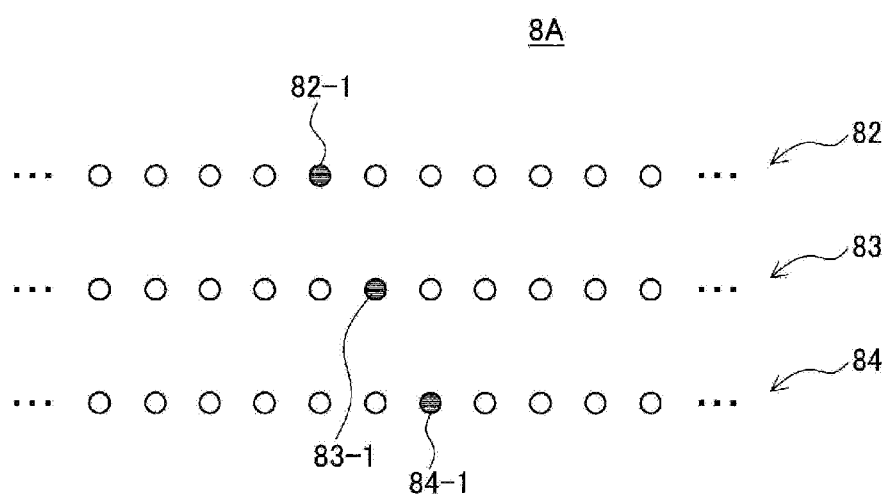
FIG. 23 is a diagram for describing another disposition example of an IR sensor according to the present modified example.

In addition, disposition of the IR sensors 8 disposed around the screen 3 is not limited to the example illustrated in FIG. 21, and may be, for example, three rows or more as illustrated in FIG. 23. In FIG. 21, IR sensors 8A including an outer IR sensor row 82, a central IR sensor row 83, and, an inner IR sensor row 84 are illustrated. In this case, IR is sensed sequentially by an outer IR sensor 82-1, a central IR sensor 83-1, and an inner IR sensor 84-1, and a light emission trajectory is estimated as being present on an extension line connecting the sensors. Note that, by setting the number of IR sensor rows to three or more, a light emission trajectory can be estimated even in a case in which any row fails to sense IR since at least two rows or more are necessary for estimating a light emission trajectory.

Figure 24:
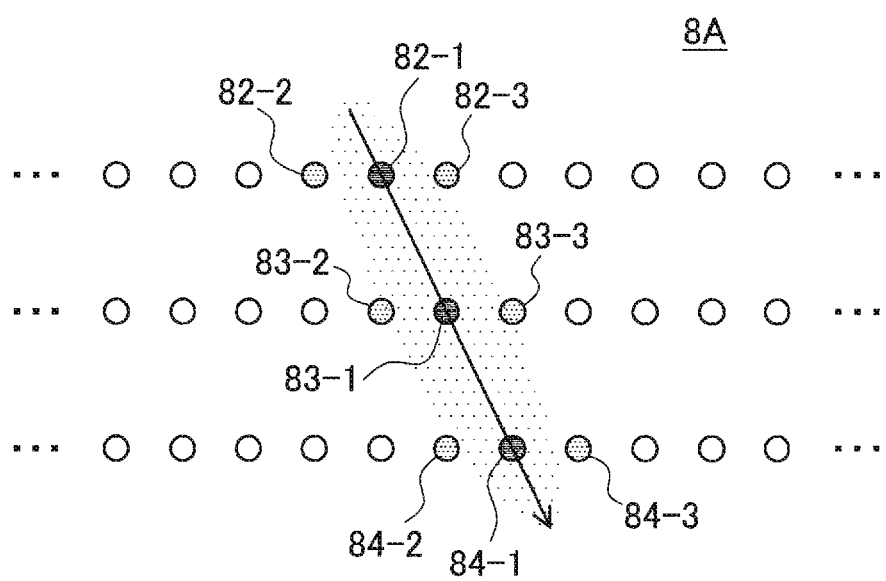
FIG. 24 is a diagram for describing a case in which IR is sensed simultaneously by a plurality of IR sensors.

FIG. 24 is a diagram for describing a case in which IR is sensed simultaneously by a plurality of IR sensors. In a case in which IR passes through the IR sensors 8A in three rows at a sufficiently high velocity, for example, it is assumed that IR is sensed simultaneously by a plurality of IR sensors 82-1, 83-1, and 84-1 as illustrated in FIG. 24. In addition, in a case in which a size of irradiation is large, it is assumed that IR is sensed even by peripheral IR sensors 82-2, 82-3, 83-2, 83-3, 84-2, and 84-3 as illustrated in FIG. 24. In this case, the control unit 10 of the information processing apparatus 1 can determine a central axis from the distribution of intensities of the IR and estimate a light emission trajectory on the basis of the detection result of each of the IR sensors.

Figure 25:
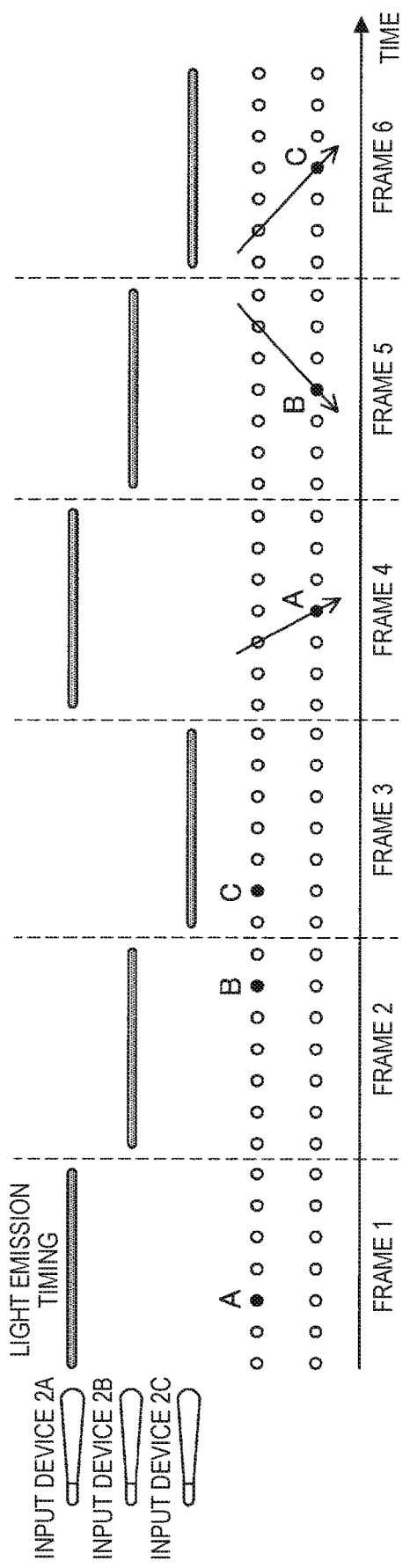
FIG. 25 is a diagram for describing synchronization control of a light emission timing and a sensing timing according to the present modified example.

FIG. 25 is a diagram for describing synchronization control of a light emission timing and a sensing timing. In the present modified example, IR emission timings of the input devices 2 are synchronized with IR sensing timings of the IR sensors 8, IR from each of the input devices 2 is set to be sensed only at specific timings, and thereby a plurality of people can be identified (the plurality of input device 2 can be discriminated) only with a single wavelength. For example, the control unit 10 of the information processing apparatus 1 determines that a sensing result of the IR sensor acquired at the timing at which the input device 2A emits light corresponds to the input device 2A, and a sensing result of the IR sensor acquired at the timing at which the input device 29 emits light corresponds to the input device 2 B. Then, when sensing results of an outer IR sensor and an inner IR sensor corresponding to the input device 2A are acquired, it is estimated that a light emission trajectory of the input device 2A is present on the extension line connecting the sensors.

Although IR sensors are used as an example of sensors that sense invisible light in the second modified example described above, the present embodiment is not limited thereto, and other sensors that sense light emitted from the input devices 2 may be disposed.

5. Supplement

Next, the information processing system according to an embodiment of the present disclosure will be supplemented.

Although the case in which invisible light rays such as infrared rays are emitted as inputs of the input devices 2 has been described in the above embodiment, the present disclosure is not limited thereto, and a light source may emit visible light, and a sound source with directivity is can also be used. In a case in which visible light rays are emitted, a user can see a position on a screen to which the user's input device 2 irradiates light, which may give influence on the screen, and thus the user can feel the feedback.

The light source or sound source of the input device 2 may perform output only when the user operates the operation unit 21 provided in the input device 2 to set input to be ON.

As an application of the present information processing system, a case in which a display screen, a specific area, or an object (including a real object) is shared by a plurality of people is assumed.

The discrimination unit 102 can estimate a projection direction (an incidence angle) with respect to the screen 3 on the basis of a reflection intensity of the screen 3 and thereby can discriminate an input device. Specifically, when a corresponding input device 2 is discriminated by varying degrees of brightness (luminance values) of input devices 2 from each other to use differences in brightness, the input device 2 can be discriminated on the basis of the reflection intensity and projection direction on the screen 3 side from a captured image of the screen 3. At this time, the position of the user with respect to the screen 3 is generally fixed and known.

The input device 2 may emit light from the light emission unit 22 only while the operation unit 21 is operated to set input to be ON and transmit real-time sensor information sensed by the sensor unit 25 from the communication unit 23 to the information processing apparatus 1. In addition, the input device 2 may perform determination of a predetermined threshold value and recognition of a gesture on the basis of the sensor information and control such that the input is set to be ON only in a case in which a condition is satisfied and light is emitted from the light emission unit 22. The input device 2 may perform control such that light emission from the light emission unit 22 and transmission of sensor information are performed only, for example, in a case in which the input device 2 is swung at a speed equal to or higher than a predetermined value or a predetermined motion is made. Note that the input device 2 may be in a sleep mode for a predetermined time after sensor information is transmitted once or light is emitted once.

In addition, the information processing apparatus 1 can learn a swing habit of the input device 2 of each user to raise accuracy in discrimination of the input device 2.

In a case in which individual users can be identified, haptic stimulation signals or sound signals different for each of the users can also be presented. Since there are cases in Which adults and children feel vibration at different intensities, for example, haptic stimulation signals may be changed in accordance with situations so that adults as well as children can perceive vibration at the same level. In addition, it is also possible to change terminology or the like in presented information in accordance with user attributes. In addition, weak haptic stimulation signals may be generated in cases of elderlies, pregnant women, injured persons, people with physical disabilities, and the like.

Since the information processing apparatus 1 can ascertain who attacked the stereoscopic object 30 through discrimination of the input devices 2, it is also possible to change visual feedback or effects with respect to the screen 3 depending on who hit the object.

A combination of n types of wavelength and the input devices 2 described in the first embodiment can also be dynamically changed. For example, the information processing apparatus 1 causes light with a first wavelength to be emitted when a first user operates an input device 2a, and light with a second wavelength to be emitted when a second user operates the input device 2b during the aforementioned operation. Next, in a case in which a third user operates an input device 2c when the first user finishes the operation of the input device 2a but the second user is operating the input device 2, light with the first wavelength is emitted from the input device 2c. Then, in a case in which the first user operates the input device 2a again during an operation of the second and third users, light with the first and second wavelengths (a plurality of wavelengths) is emitted from the input device 2. As described above, the information processing apparatus 1 can increase the number of people that can be identified at the same time by performing control such that light with a wavelength that does not overlap a wavelength of another light emission is emitted in a case in which light emission is controlled during operations of the input devices 2 (or in a case in which input is set to be ON). Four or more people, for example, can be identified using two types of wavelengths.

In addition, in a case in which it is not possible to discriminate the input devices 2 corresponding to pointers, the information processing apparatus 1 may render feedback of better pointers (which satisfy a predetermined condition) among the plurality of pointers to a plurality of input devices 2 of which discrimination is not possible.

In addition, the information processing apparatus 1 may calibrate various threshold values in advance for the input devices 2. Accordingly, it is possible to deal with cases, for example, in which light emission intensity becomes week, and an individual difference of a number of the input devices 2 can be absorbed. In addition, the various threshold values can be calibrated for each user attribute (adult, child, or age). In a case in which light emission is controlled when the input devices 2 are swung at a certain speed or higher, for example, the threshold values at which the light emission control is performed are adjusted in accordance with a user attribute due to there being a difference between adults and children.

In addition, the number of discrimination methods for the input device 2 (i.e., the number of individual identification methods) can be increased using a plurality of combinations of the above-described discrimination methods.

6. Conclusion

As described above, in the information processing system according to the embodiments of the present disclosure, a predetermined haptic stimulus can be presented to a corresponding input device on the basis of inputs from a number of input devices and thus an intuitive haptic interface with a deeper sense of realism can be realized.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a central processing unit (CPU), read-only memory (ROM), and random access memory (RAM) built into the information processing apparatus 1 or the input device 2 described above to exhibit the functions of the information processing apparatus 1 or the input device 2. In addition, a computer-readable storage medium storing the computer program is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:
  an acquisition unit configured to acquire a plurality of pieces of pointer information on the basis of one or a plurality of pieces of sensor data;
  a discrimination unit configured to discriminate an input device corresponding to each pointer on the basis of characteristics of the plurality of pieces of pointer information; and
  a generation unit configured to generate a predetermined haptic stimulation signal to be output to an input device corresponding to a pointer in a case in which a position of the pointer satisfies a predetermined condition.

(2)

The information processing apparatus according to (1), in which the generation unit generates the predetermined haptic stimulation signal in a case in which a position or a trajectory of the pointer is superimposed on a specific stereoscopic object.

(3)

The information processing apparatus according to (1) or (2), further including:
  a transmission unit configured to transmit the generated haptic stimulation signal to a corresponding input device.

(4)

The information processing apparatus according to any one of (1) to (3), in which, in the case in which a position of the pointer satisfies the predetermined condition, the generation unit further generates a predetermined haptic stimulation signal to be output to a haptic stimulus output device worn by a user who is carrying the input device corresponding to the pointer.

(5)

The information processing apparatus according to any one of (1) to (4), in which the sensor data is information of a captured image in which a display screen being irradiated with a pointer is captured.

(6)

The information processing apparatus according to any one of (1) to (5), in which the characteristics of the pointer information include a combination of a plurality of wavelengths.

(7)

The information processing apparatus according to (6), in which the characteristics of the pointer information include a shape of a mark.

(8)

The information processing apparatus according to in which the characteristics of the pointer information include a state during a swing.

(9)

The information processing apparatus according to (6), in which the characteristics of the pointer information include a state of a mark.

(10)

The information processing apparatus according to (6), in which an input device corresponding to the combination of the plurality of wavelengths is dynamically constructed.

(11)

The information processing apparatus according to any one of (6) to (10), in which the discrimination unit discriminates an input device corresponding to a pointer with substantially same coordinates on a plurality of captured images on the basis of information of each of the captured images captured by a plurality of imaging apparatuses with hand-pass filters corresponding to respective different wavelengths.

(12)

The information processing apparatus according to any one of (1) to (11), in which the acquisition unit acquires pointer information corresponding to an input timing of the input device.

(13)

The information processing apparatus according to any one of (1) to (12), in which the discrimination unit discriminates an input device corresponding to each pointer on the basis of sensor information sensed by a sensor of the input device and characteristics of the pointer information.

(14)

The information processing apparatus according to any one of (1) to (13), in which, in a case in which sensor information sensed by a sensor of the input device satisfies a predetermined condition, an input is performed by the input device.

(15)

The information processing apparatus according to any one of (12) to (14), in which an input of the input device is light emission from a light emission unit provided in the input device.

(16)

The information processing apparatus according to any one of (13) to (15), in which the discrimination unit discriminates the input device corresponding to the pointer on the basis of at least one of motion sensor information or attitude sensor information output from the input device and a trajectory or an angle of the trajectory of the pointer indicated by the characteristics of the pointer information.

(17)

The information processing apparatus according to (3), in which, in a case in which it is not possible to discriminate each of input devices corresponding to a plurality of pointers, if there is a pointer satisfying the predetermined condition among the plurality of pointers, the transmission unit transmits a predetermined haptic stimulation signal to be output to the input device corresponding to the pointer satisfying the condition to all input devices of which the discrimination is not possible.

(18)

An information processing method including, by a processor:

acquiring a plurality of pieces of pointer information on the basis of one or a plurality of pieces of sensor data;

discriminating an input device corresponding to each pointer on the basis of characteristics of the plurality of pieces of pointer information; and generating a predetermined haptic stimulation signal to be output to an input device corresponding to a pointer in a case in which a position of the pointer satisfies a predetermined condition.

(19)

A program causing a computer to function as:

an acquisition unit configured to acquire a plurality of pieces of pointer information on the basis of one or a plurality of pieces of sensor data;

a discrimination unit configured to discriminate an input device corresponding to each pointer on the basis of characteristics of the plurality of pieces of pointer information; and a generation unit configured to generate a predetermined haptic stimulation signal to be output to an input device corresponding to a pointer in a case in which a position of the pointer satisfies a predetermined condition.

REFERENCE SIGNS LIST 1 information processing apparatus
2, 2-1, 2-2 input device
3 screen
4 haptic stimulus output device
4-1 band-type haptic stimulus output device
4-2 jacket-type haptic stimulus output device
5 projector
6 camera
7 speaker
10 control unit
11 communication unit
12 input unit
13 output unit
14 storage unit
20 control unit
21 operation unit
22 light emission unit
23 communication unit
24 vibration unit
25 sensor unit
30 stereoscopic object
41 vibration unit
42 vibration unit
43 stereo speaker
101 information analysis unit
102 discrimination unit
103 output signal generation unit

The invention claimed is:

1. An information processing apparatus comprising:
circuitry configured to
acquire a plurality of pieces of pointer information on a basis of one or a plurality of pieces of sensor data,
discriminate a respective input device of a plurality of input devices corresponding to each respective pointer of a plurality of pointers on a basis of characteristics of the plurality of pieces of pointer information, and generate a predetermined haptic stimulation signal to be output to the respective input device corresponding to the respective pointer in a case in which a position of the respective pointer satisfies a predetermined condition, wherein the characteristics of the plurality of pieces of pointer information used to discriminate each respective input device include a unique combination of one or more wavelengths of a plurality of wavelengths, the unique combination corresponding to the respective input device, wherein a number of the plurality of input devices is greater than a number of the plurality of wavelengths, wherein the circuitry discriminates the respective input device based on the plurality of pieces of sensor data acquired from a plurality of cameras, and wherein a number of the plurality of cameras is equal to the number of the plurality of wavelengths.

2. The information processing apparatus according to claim 1, wherein the circuitry generates the predetermined haptic stimulation signal in a case in which a trajectory of the respective pointer is superimposed on a specific stereoscopic object.

3. The information processing apparatus according to claim 1,
wherein the circuitry is further configured to transmit the generated haptic stimulation signal to each corresponding input device.

4. The information processing apparatus according to claim 1, wherein, in the case in which the position of the respective pointer satisfies the predetermined condition, the circuitry is further configured to generate a predetermined haptic stimulation signal to be output to a haptic stimulus output device worn by a user who is carrying the respective input device corresponding to the respective pointer.

5. The information processing apparatus according to claim 1, wherein the sensor data includes information of a captured image in which a display screen being irradiated with one or more pointers of the plurality of pointers is captured.

6. The information processing apparatus according to claim 1, wherein the characteristics of the plurality of pieces of the pointer information include a shape of a mark corresponding to each pointer.

7. The information processing apparatus according to claim 1, wherein the characteristics of the plurality of pieces of the pointer information include a state during a swing of one or more pointers of the plurality of pointers.

8. The information processing apparatus according to claim 1, wherein the characteristics of the plurality of pieces of the pointer information include a state of a mark corresponding to each pointer.

9. The information processing apparatus according to claim 1, wherein the discriminated respective input device corresponding to each respective pointer based on the unique combination of the one or more wavelengths of the plurality of wavelengths is dynamically constructed.

10. The information processing apparatus according to claim 1, wherein the circuitry discriminates the respective input device corresponding to each respective pointer with substantially same coordinates on a plurality of captured images on a basis of information of each of the captured images captured by a plurality of imaging apparatuses with band-pass filters corresponding to respective different wavelengths.

11. The information processing apparatus according to claim 1, wherein the circuitry acquires the plurality of pieces of pointer information corresponding to a timing of an input of the respective input device corresponding to each respective pointer.

12. The information processing apparatus according to claim 1, wherein the circuitry discriminates the respective input device corresponding to each respective pointer on a basis of sensor information sensed by a sensor of the respective input device and the characteristics of the plurality of pieces of pointer information.

13. The information processing apparatus according to claim 1, wherein, in a case in which sensor information sensed by a respective sensor of the respective input device satisfies the predetermined condition, an input is performed by the respective input device.

14. The information processing apparatus according to claim 11, wherein the input of the respective input device includes light emission from a light emission unit provided in the respective input device.

15. The information processing apparatus according to claim 12, wherein the circuitry discriminates the respective input device corresponding to each respective pointer on a basis of
at least one of motion sensor information or attitude sensor information output from the respective input device, and
at least one of a trajectory or an angle of the trajectory of the respective pointer indicated by the characteristics of the pointer information.

16. The information processing apparatus according to claim 3, wherein, in a case in which it is not possible to discriminate each respective input device of the plurality of input devices corresponding to the plurality of pointers, if there is any pointer satisfying the predetermined condition among the plurality of pointers, the circuitry transmits a predetermined haptic stimulation signal to be output to each input device of the input devices of which discrimination is not possible corresponding to all of the pointers satisfying the predetermined condition.

17. An information processing method comprising, by a processor:
acquiring a plurality of pieces of pointer information on a basis of one or a plurality of pieces of sensor data;
discriminating a respective input device of a plurality of input devices corresponding to each respective pointer of a plurality of pointers on a basis of characteristics of the plurality of pieces of pointer information; and
generating a predetermined haptic stimulation signal to be output to the respective input device corresponding to the respective pointer in a case in which a position of the respective pointer satisfies a predetermined condition,
wherein the characteristics of the plurality of pieces of pointer information used to discriminate each respective input device include a unique combination of one or more of a plurality of wavelengths, the unique combination corresponding to the respective input device,
wherein a number of the plurality of input devices is greater than a number of the plurality of wavelengths,
wherein the respective input device is discriminated based on the plurality of pieces of sensor data acquired from a plurality of cameras, and wherein a number of the plurality of cameras is equal to the number of the plurality of wavelengths.

18. A non-transitory computer-readable medium having embodied thereon a program, which when executed by a computer causes the computer to execute a method, the method comprising:

acquiring a plurality of pieces of pointer information on a basis of one or a plurality of pieces of sensor data;

discriminating a respective input device of a plurality of input devices corresponding to each respective pointer of a plurality of pointers on a basis of characteristics of the plurality of pieces of pointer information; and generating a predetermined haptic stimulation signal to be output to the respective input device corresponding to the respective pointer in a case in which a position of the respective pointer satisfies a predetermined condition, wherein the characteristics of the plurality of pieces of pointer information used to discriminate each respective input device include a unique combination of one or more of a plurality of wavelengths, the unique combination corresponding to the respective input device, wherein a number of the plurality of pointers is greater than a number of the plurality of wavelengths, wherein the respective input device is discriminated based on the plurality of pieces of sensor data acquired from a plurality of cameras, and wherein a number of the plurality of cameras is equal to the number of the plurality of wavelengths.

19. The information processing apparatus according to claim 1, wherein the circuitry generates the predetermined haptic stimulation signal based on a state of a swing of the respective input device corresponding to the respective pointer.

* * * * *